US012739788B2

(12) United States Patent
Göktepe et al.

(10) Patent No.: US 12,739,788 B2
(45) Date of Patent: Sep. 15, 2026

(54) ENHANCED MECHANISMS FOR HANDLING OPERATION REQUESTS FOR SINGLE/MULTI-CONNECTION DEVICES

(71) Applicant: KONINKLIJKE PHILIPS N.V., Eindhoven (NL)

(72) Inventors: Baris Göktepe, Berlin (DE); Roya Ebrahim Rezagah, Berlin (DE); Nithin Srinivasan, Berlin (DE); Thomas Fehrenbach, Berlin (DE); Thomas Wirth, Berlin (DE); Thomas Schierl, Berlin (DE); Cornelius Hellge, Berlin (DE)

(73) Assignee: Koninklijke Philips N.V., Eindhoven (NL)

( * ) Notice: Subject to any disclaimer, the term of this patent is extended or adjusted under 35 U.S.C. 154(b) by 639 days.

(21) Appl. No.: 17/661,156

(22) Filed: Apr. 28, 2022

(65) Prior Publication Data

US 2022/0295445 A1 Sep. 15, 2022

Related U.S. Application Data

(63) Continuation of application No. PCT/EP2020/080270, filed on Oct. 28, 2020.

(30) Foreign Application Priority Data

Nov. 6, 2019 (EP) .................................... 19207514

(51) Int. Cl.
*H04W 68/02* (2009.01)
*H04W 8/20* (2009.01)
(Continued)

(52) U.S. Cl.
CPC ........... *H04W 68/02* (2013.01); *H04W 8/205* (2013.01); *H04W 68/005* (2013.01); *H04W 88/06* (2013.01)

(58) Field of Classification Search
CPC ... H04W 68/02; H04W 8/205; H04W 68/005; H04W 88/06; H04W 60/005;
(Continued)

(56) References Cited

U.S. PATENT DOCUMENTS 10,687,909 B2 6/2020 Noonan et al.
2007/0142047 A1* 6/2007 Heeschen ............. H04W 68/12 455/435.1
(Continued)

FOREIGN PATENT DOCUMENTS

EP 2557890 A1 2/2013
WO 2015192883 A1 12/2015
WO 2018034612 A1 2/2018

OTHER PUBLICATIONS

3GPP TS 38.331 V15.3.0 (Sep. 2018), Technical Specification Group Radio Access Network; Radio Resource Control (RRC) protocol specification (Release 15), Sep. 2018, 445 pp.
(Continued)

*Primary Examiner* — Margaret G Webb

(57) ABSTRACT

A user device, UE, for a wireless communication system is described. The UE is to signal to the wireless communication system information enabling a network entity of the wireless communication system to decide how to handle one or more incoming operation requests for the UE.

16 Claims, 17 Drawing Sheets

(51) Int. Cl.
*H04W 68/00* (2009.01)
*H04W 88/06* (2009.01)

(58) Field of Classification Search
CPC ....... H04W 8/183; H04W 8/24; H04W 48/18; H04W 74/0833
See application file for complete search history.

(56) References Cited

U.S. PATENT DOCUMENTS

| | | | | |
|---|---|---|---|---|
| 2010/0124223 | A1 | 5/2010 | Gibbs et al. | |
| 2010/0183139 | A1 | 7/2010 | Mcnamara et al. | |
| 2012/0026929 | A1* | 2/2012 | Wang | H04L 12/1863 370/312 |
| 2017/0013422 | A1* | 1/2017 | Saiwai | H04W 4/06 |
| 2018/0049157 | A1* | 2/2018 | Griot | H04W 68/02 |
| 2019/0068327 | A1* | 2/2019 | Ho | H04L 1/0009 |
| 2019/0394686 | A1* | 12/2019 | Bachmann | H04W 52/0235 |
| 2021/0297341 | A1* | 9/2021 | Achouri | H04W 4/44 |

OTHER PUBLICATIONS

"NR and NG-RAN Overall Description", 3rd Generation Partnership Project; Technical Specification Group Radio Access Network; Stage 2 (Release 15); 3GPP Draft; TS 38300-F70; Sep. 26, 2019, XP051799944, Sep. 26, 2019, 99 pp.

"Evolved Universal Terrestrial Radio Access (E-UTRA)" (Uploaded in 2 parts), 3GPP TS 36.331 V15.3.0 (Sep. 2018), Technical Specification Group Radio Access Network; Radio Resource Control (RRC); Protocol specification (Release 15), Sep. 2018, 918 pp.

Dahlmann, Erik, et al., "5G NR the Next Generation Wireless Access Technology", Elsevier Academic Press, 2018, 469 pp.

Intel et al., S1-192809, Service requirements for enabling Multi-USIM devices support, 3GPP TSG SA WG1 #87, 3GPP (Aug. 24, 2019).

* cited by examiner

```
---ASN1START
---TAG-UL-CCCH-MESSAGE-START

UL-CCCH-Message ::=                  SEQUENCE {
    message                              UL-CCCH-MessageType
}

UL-CCCH-MessageType ::=              CHOICE {
    c1                                   CHOICE {
        rrcSetupRequest                      RRCSetupRequest,
        rrcResumeRequest                     RRCResumeRequest,
        rrcReestablishmentRequest            RRCReestablishmentRequest,
410     rrcSystemInfoRequest                 RRCSystemInfoRequest,
        rrcPiggyBackRequest                  RRCPiggyBackRequest
    },
    messageClassExtension                SEQUENCE {}
}

---TAG-UL-CCCH-MESSAGE-STOP
---ASN1STOP
```

Fig. 6

```
---ASN1START
---TAG-UL-CCCH-MESSAGE-START


UL-CCCH-Message ::=                    SEQUENCE {
      message                                UL-CCCH-MessageType
}

UL-CCCH-MessageType ::=                CHOICE {
      c1                                     CHOICE {
           measurementReport                      MeasurementReprot,
           rrcReconfigurationComplete             RRCReconfigurationComplete,
           rrcSetupComlpete                       RRCSetupComlpete,
           rrcReestablishmentComplete             RRCReestablishmentComplete,
410        rrcResumeComplete                      RRCResumeComplete,
           rrcPiggyBack                           RRCPiggyBack,
           securityModeComplete                   SecurityModeComplete,
           securityModeFailure                    SecurityModeFailure,
           ulinformationTransfer                  ULinformationTransfer,
           locationMeasurementindication          LocationMeasurementindication,
           ueCapabilityInformation                UECapabilityInformation,
           counterCheckResponse                   CounterCheckResponse,
           ueAssistanceInformation                UEAssistanceInformation,
           failureInformation                     FailureInformation,
           spare3 NULL,
           spare2 NULL, sparel NULL
      },
      messageClassExtension                  SEQUENCE {}
}

---TAG-UL-CCCH-MESSAGE-STOP
---ASN1STOP
```

Fig. 7

```
---ASN1START
---TAG-UL-CCCH-MESSAGE-START

DL-DCCH-Message ::=                 SEQUENCE {
      message                             DL-DCCH-MessageType
}

DL-DCCH-MessageType ::=             CHOICE {
      c1                                  CHOICE {
            rrcReconfiguration                  RRCReconfiguration,
            rrcResume                           RRCResume,
            rrcRelease                          RRCRelease,
410         rrcReestablishment                  RRCReestablishment,
            rrcPiggyBack                        RRCPiggyBack,
            securityModeCorrnnand               SecurityModeCommand,
            dlInformationTranfser               DLInformationTranfser,
            ueCapabilityEnquiry                 UECapabilityEnquiry,
            counterCheck                        CounterCheck,
            mobilityFromNRCommand               MobilityFromNRCommand,
            spare7 NULL,
            spare6 NULL, spare5 NULL, spare4 NULL,
            spare3 NULL, spare2 NULL, spare1 NULL
      },
      messageClassExtension           SEQUENCE {}
}

---TAG-UL-CCCH-MESSAGE-STOP
---ASN1STOP
```

Fig. 8

ENHANCED MECHANISMS FOR HANDLING OPERATION REQUESTS FOR SINGLE/MULTI-CONNECTION DEVICES

CROSS-REFERENCE TO RELATED APPLICATIONS

This application is a continuation of copending International Application No. PCT/EP2020/080270, filed Oct. 28, 2020, which is incorporated herein by reference in its entirety, and additionally claims priority from European Application No. 19207514.1, filed Nov. 6, 2019, which is also incorporated herein by reference in its entirety.

The present invention concerns the field of wireless communication systems or networks, more specifically to the handling of operation requests for a user device, like a UE. Embodiments concern enhancements or improvements of a paging mechanism for a single or multi connection user device, like a single-slim or multi-sim device.

BACKGROUND OF THE INVENTION

FIG. 1 is a schematic representation of an example of a terrestrial wireless network 100 including, as is shown in FIG. 1(*a*), a core network 102 and one or more radio access networks $RAN_1$, $RAN_2$, . . . $RAN_N$. FIG. 1(*b*) is a schematic representation of an example of a radio access network $RAN_n$ that may include one or more base stations $gNB_1$ to $gNB_5$, each serving a specific area surrounding the base station schematically represented by respective cells $\mathbf{106}_1$ to $\mathbf{106}_5$. The base stations are provided to serve users within a cell. It is noted that a base station may also operate multiple, i.e., two or more cells (not illustrated in FIG. 1), and, in case a base station operates multiple cells, neighboring cells may include cells operated by the same base station and/or cells operated by the different base stations, i.e., a neighboring cell may also be a different cell of the same base station or a different cell of a different same base station. The one or more base stations may serve users in licensed and/or unlicensed bands. The term base station, BS, refers to a gNB in 5G networks, an eNB in UMTS/LTE/LTE-A/LTE-A Pro, or just a BS in other mobile communication standards. A user may be a stationary device or a mobile device. The wireless communication system may also be accessed by mobile or stationary IoT devices which connect to a base station or to a user. The mobile devices or the IoT devices may include physical devices, ground based vehicles, such as robots or cars, aerial vehicles, such as manned or unmanned aerial vehicles (UAVs), the latter also referred to as drones, buildings and other items or devices having embedded therein electronics, software, sensors, actuators, or the like as well as network connectivity that enables these devices to collect and exchange data across an existing network infrastructure. FIG. 1(*b*) shows an exemplary view of five cells, however, the $RAN_n$ may include more or less such cells, and $RAN_n$ may also include only one base station. FIG. 1(*b*) shows two users $UE_1$ and $UE_2$, also referred to as user equipment, UE, that are in cell $\mathbf{106}_2$ and that are served by base station $gNB_2$. Another user $UE_3$ is shown in cell $\mathbf{106}_4$ which is served by base station $gNB_4$. The arrows $\mathbf{108}_1$, $\mathbf{108}_2$ and $\mathbf{108}_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(*b*) shows two IoT devices $\mathbf{110}_1$ and $\mathbf{110}_2$ in cell $\mathbf{106}_4$, which may be stationary or mobile devices. The IoT device $\mathbf{110}_1$ accesses the wireless communication system via the base station $gNB_4$ to receive and transmit data as schematically represented by arrow $\mathbf{112}_1$. The IoT device $\mathbf{110}_2$ accesses the wireless communication system via the user $UE_3$ as is schematically represented by arrow $\mathbf{112}_2$. The respective base station $gNB_1$ to $gNB_5$ may be connected to the core network 102, e.g. via the S1 interface, via respective backhaul links $\mathbf{114}_1$ to $\mathbf{114}_5$, which are schematically represented in FIG. 1(*b*) by the arrows pointing to "core". The core network 102 may be connected to one or more external networks. Further, some or all of the respective base station $gNB_1$ to $gNB_5$ may connected, e.g. via the S1 or X2 interface or the XN interface in NR, with each other via respective backhaul links $\mathbf{116}_1$ to $\mathbf{116}_5$, which are schematically represented in FIG. 1(*b*) by the arrows pointing to "gNBs".

For data transmission a physical resource grid may be used. The physical resource grid may comprise a set of resource elements to which various physical channels and physical signals are mapped. For example, the physical channels may include the physical downlink, uplink and sidelink shared channels (PDSCH, PUSCH, PSSCH) carrying user specific data, also referred to as downlink, uplink and sidelink payload data, the physical broadcast channel (PBCH) carrying for example a master information block (MIB) and a system information block (SIB), the physical downlink, uplink and sidelink control channels (PDCCH, PUCCH, PSCCH) carrying for example the downlink control information (DCI), the uplink control information (UCI) and the sidelink control information (SCI). For the uplink, the physical channels may further include the physical random access channel (PRACH or RACH) used by UEs for accessing the network once a UE synchronized and obtained the MIB and SIB. The physical signals may comprise reference signals or symbols (RS), synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols depending on the cyclic prefix (CP) length. A frame may also consist of a smaller number of OFDM symbols, e.g. when utilizing shortened transmission time intervals (sTTI) or a mini-slot/non-slot-based frame structure comprising just a few OFDM symbols.

The wireless communication system may be any single-tone or multicarrier system using frequency-division multiplexing, like the orthogonal frequency-division multiplexing (OFDM) system, the orthogonal frequency-division multiple access (OFDMA) system, or any other IFFT-based signal with or without CP, e.g. DFT-s-OFDM. Other waveforms, like non-orthogonal waveforms for multiple access, e.g. filter-bank multicarrier (FBMC), generalized frequency division multiplexing (GFDM) or universal filtered multi carrier (UFMC), may be used. The wireless communication system may operate, e.g., in accordance with the LTE-Advanced pro standard, or the 5G or NR, New Radio, standard, or the NU-U, New Radio Unlicensed, standard.

The wireless network or communication system depicted in FIG. 1 may by a heterogeneous network having distinct overlaid networks, e.g., a network of macro cells with each macro cell including a macro base station, like base station $gNB_1$ to $gNB_5$, and a network of small cell base stations (not shown in FIG. 1), like femto or pico base stations.

In addition to the above described terrestrial wireless network also non-terrestrial wireless communication networks exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication systems or networks, like those described above with reference to FIG. 1, for example in a LTE or 5G/NR network, the respective entities may communicate using a plurality of frequency bands, also referred to as a wideband operation. In a wideband operation, for example, the base station, gNB, and/or the user device, UE, may transmit on multiple subbands. The subbands may have different bandwidths or the same bandwidth, like 20 MHz. Some or all of the subbands may be unlicensed bands. For communicating on an unlicensed band, the gNB and UE perform listen-before-talk, LBT, separately per unlicensed subband which may lead to a situation that one or more of the subbands to be used for the wideband operation, also referred to as a subset of the subbands, is busy or occupied due to a transmission or interference by one or more other public land mobile networks, PLMNs, or by one or more other communication systems coexisting on the same frequency band, for example systems operating in accordance with the IEEE 802.11 specification.

It is noted that the information in the above section is only for enhancing the understanding of the background of the invention and therefore it may contain information that does not form conventional technology that is already known to a person of ordinary skill in the art.

SUMMARY

An embodiment may have a user device, UE, for a wireless communication system, wherein the UE is to signal to the wireless communication system information enabling a network entity of the wireless communication system to decide how to handle one or more incoming operation requests for the UE.

According to another embodiment, a user device, UE, for one or more wireless communication systems, may have: one or more transceiver chains, wherein the UE is to share at least one transceiver chain with at least two connections to the one or more wireless communication systems, and wherein the UE is to signal to the wireless communication system information enabling a network entity of the wireless communication system to decide how to handle one or more incoming operation requests for the UE.

Another embodiment may have a network entity for a wireless communication system, the wireless communication system including one or more user devices, UEs, the network entity is to decide how to handle one or more incoming operation requests for one or more user devices, UEs.

According to another embodiment, a wireless communication system may have: one or more UEs, and one or more network entities, wherein one or more of the UEs comprises an inventive UE, and/or wherein one or more network entities comprises an inventive network entity.

According to another embodiment, a method for operating a wireless communication system may have the steps of: signaling, by a user device, UE, to the wireless communication system information enabling a network entity of the wireless communication system to decide how to handle one or more incoming operation requests for the UE, wherein the UE is a single-connection UE or a multi-connection UE, the multi-connection UE including one or more transceiver chains, wherein at least one transceiver chain is shared by at least two connections to the one or more wireless communication systems.

According to another embodiment, a method for operating a wireless communication system may have the step of: deciding, by a network entity of the wireless communication system, how to handle one or more incoming operation requests for one or more user devices, UEs, of the wireless communication system.

Another embodiment may have a non-transitory digital storage medium having a computer program stored thereon to perform any of the inventive methods when said computer program is run by a computer.

BRIEF DESCRIPTION OF THE DRAWINGS

Embodiments of the present invention will be detailed subsequently referring to the appended drawings, in which:

FIG. 6 illustrates an RRC specification example for the common control channel, CCCH from the UE to the network including as new UL-CCCH-message type an RRC piggyback request;

FIG. 7 illustrates an RRC specification example for the dedicated control channel, DCCH from the UE to the network including as new UL-DCCH-message type an RRC piggyback request;

FIG. 8 illustrates an RRC specification example for the dedicated control channel, DCCH from the network to the UE including as new DL-DCCH-message type an RRC piggyback request;

DETAILED DESCRIPTION OF THE INVENTION

Figure 1A:
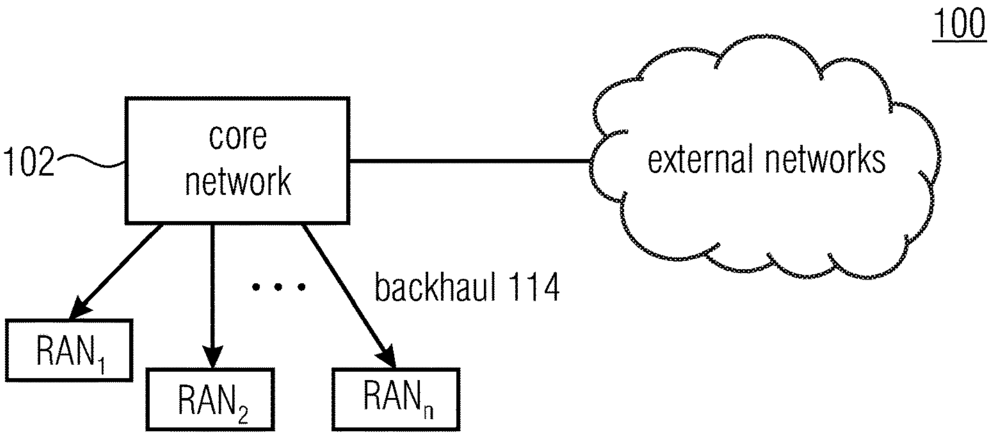
FIG. 1*a-b* shows a schematic representation of an example of a wireless communication system.

Embodiments of the present invention are now described in more detail with reference to the accompanying drawings in which the same or similar elements have the same reference signs assigned.

In wireless communication systems or networks, like the one described above with reference to FIG. 1, one or more of the mobile users, UEs, may be so-called multi-connection mobile users or multi-connection UEs. A multi-connection UE may include one or more transmitter (Tx)/receiver (Rx) chains, also referred to as radio frequency, RF, transceiver chains. The multi-connection UE shares an RF transceiver chain with two or more connections, which also may be referred to as independent or shared connections, so that, at a certain point in time only one of the connections has access to the RF transceiver chain. In other words, at a certain point in time the UE is connected to a network entity with a current one of the connections that share the RF transceiver chain, and the network entity may be a base station in case of a communication over the Uu interface, or it may be a other UE in case of a sidelink communication using, for example, the PC5 interface. The current connection may also be referred to as being in the connected state. The other connections that share with the current connection the RF transceiver chain are in a state in which they have no active connection to a network entity, however, the other connections are able to perform one or more operations at respective operation occasions. The network entity may be a network entity different from the one to which the current connection communicates. For example, when considering the a wireless communication system, some of the base stations may be operated in accordance with a first standard, like the GSM or LTE standard, while other base stations may be operated in accordance with another standard, like the NR standard. Thus, the multi-connection UE may provide for a first connection to the GSM network and for a second connection to the NR network via a common RF transceiver chain so that, when the UE is connected via its current connection to the GSM network, this connection is in the connected state, while the second connection to the NR system is not active, for example is in an idle state or in an inactive state or in a DRX cycle. The respective network entities are not necessarily associated with different standards, rather, the network entities may employ the same standard, for example, the UE may provide for two independent connections to two different network entities of the same network, like a NR network. The entities may be operated by the same or by different mobile network operators, MNOs.

Thus, the multi-connection UE may share a transceiver among two or more connections using the same transceiver chain so that on any transceiver chain, when the UE is to transmit or receive on a current one of the connections, the UE is not to transmit or receive on the other connections. Other multi-connection UEs may have a plurality of or at least two transceiver chains and allow to receive on current connections of the different transceiver chains simultaneously, but to transmit on the current connections of the different transceiver chains, the UE is to multiplex the transmission using the at least two transceiver chains with at least two connections to the one or more wireless communication systems, so that, when the UE is to transmit on a current one of the connections for a one transceiver chain, the UE is not to transmit on a current one of the connections of another transceiver chain.

Thus, in a scenario as explained above, the current connection is in the connected state, also referred to as to the RRC connected state. In this state, a data transfer between the UE and the network is possible. The RRC context is established. Also the core network connection is established and a network-controlled mobility is enabled. On the other hand, the other connections are in a non-active state, for example in an idle state, also referred to as the RRC idle state. In this state, no data transfer is possible, there is no RRC context and there is no core network connection. However, a device controlled mobility is enabled. In accordance with the NR approach, a new RRC state is introduced, which is referred to as the RRC inactive state. This state may be seen as being somewhat in-between the RRC idle state and the RRC connected state as it is known from the LTE standard. The RRC inactive state allows a UE to receive certain control messages as well as to send a limited set of control messages to make it easier to track a moving UE within a cell, for example in case of vehicular UEs, also referred to as V-UEs. Thus, a connection of the UE sharing the RF transceiver chain with another connection and being in the non-active state may also be in an inactive state, like the just-mentioned RRC inactive state. During the RRC inactive state, no data transfer is possible, however, the RRC context as well as the core network connection is established and also device-controlled mobility is enabled. Furthermore, the non-active connection may be in a DRX state where the UE is RRC connected but not receiving any data from the network for the duration of the DRX cycle.

The multi-connection UE may provide for an identification of the connections to the one or more wireless communication systems or the entities thereof. For example, the respective connections sharing the RF transceiver chain of the UE may be identified by one or more subscriber identities module, SIM, cards in the UE, and each SIM card is associated with one of the connections. The connections may also be identified by one or more of:

- one or more universal Subscriber Identity Module, USIM, cards, each USIM card associated with one of the connections,
- one or more universal integrated circuit cards, ICCs, each ICC associated with one of the connections,
- one or more embedded Subscriber Identity Modules, eSIMs, each eSIM associated with one of the connections,
- one or more certificates, each certificate associated with one of the connections,
- one or more pairs of username and password, each pair associated with one of the connections,
- one or more International Mobile Station Equipment Identities (IMEI) each associated with one of the connections,
- one or more Mobile Equipment Identifiers (MEID) each associated with one of the connections.

Thus, when considering a multi-connection UE as described above, the respective connections that share the RF transceiver chain, which have associated therewith the respective identifiers, may be seen from a network perspective as separate UEs being served by the respective network entities. The connections may be associated with the same or different network operators.

In a multi-connection UE as described above, certain operations may be performed at certain occasions also referred to as certain instances in time, over the respective connections that share the RF transceiver chain. Sharing the RF transceiver chain among one or more connections, however, results in a situation that a service for the UE may be provided only using of the connections, thereby rendering the UE to be not reachable using the other connections. Thus, operations may only be performed using the current connection at the certain occasions while other operations over the non-current connections which are in the non-active state, may not be performed. Thus, operations for the non-current connection may be missed by the UE. On the other hand, in case the implementation is such that the other connections become active at the occasions where their respective operations are to be performed, this results in a service interruption of the current connection to the network entity which currently serves the UE via the current connection.

The above-referenced operations may include a variety of different operations to be performed between the UE and the network at different points in time. For example, the operations may include one or more of the following:

receiving RAN-based notification area (RNA) updates,
reading a paging channel during a paging occasion, PO,
reading a PDCCH monitoring occasion, MO.

With reference to the reading of a paging channel during the paging occasion, PO, some problems with regard to the respective operations occurring at certain occasions on the different shared connections, one of which is in the connected state while the others are in the idle state or in the inactive state shall, now be discussed. The paging is a process in which an idle mode UE wakes up periodically based on a DRX, discontinuous reception, cycle to read a paging channel during the paging occasion. In case the UE finds relevant information in the paging channel, the UE will transition to the connected mode. Otherwise, the UE continues to monitor subsequent paging occasions, POs.

Figure 2A:
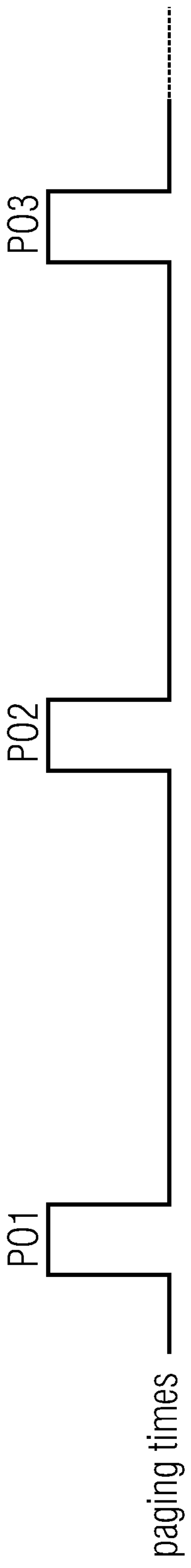
FIG. 2*a-b* illustrates a conventional paging mechanism.
Figure 2B:
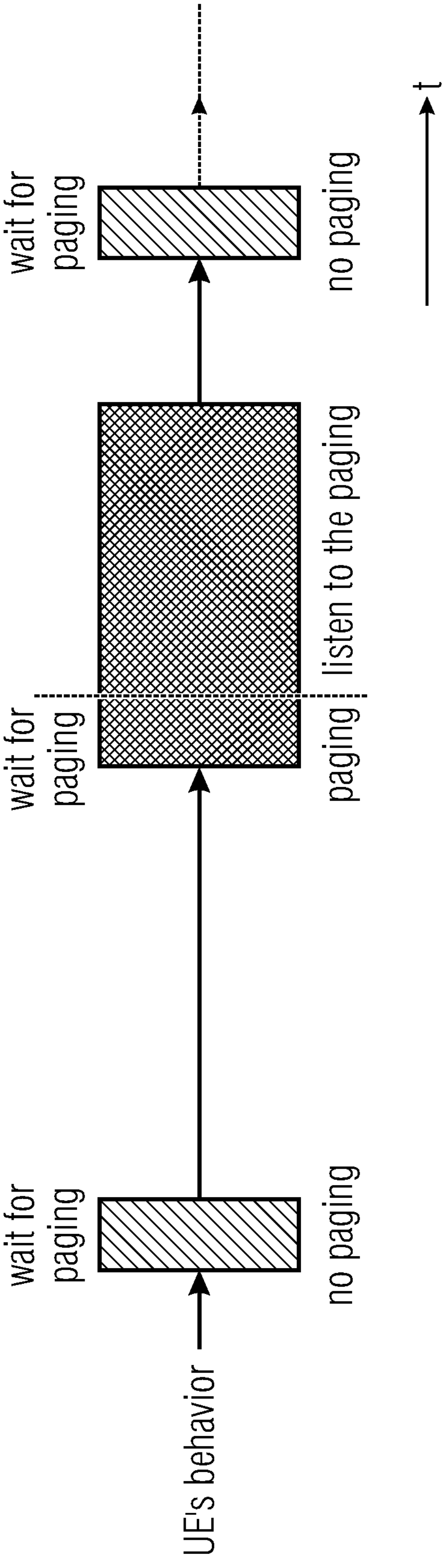

FIG. 2 illustrates a conventional paging mechanism. FIG. 2(*a*) illustrates a number of paging occasions, PO, existing during a certain period of time. FIG. 2(*b*) illustrates the behavior of a UE at such paging occasions. A UE may monitor each of the paging occasions PO1 to PO3 to listen for possible paging signals for the UE, i.e., the UE periodically listens for possible paging signals associated with the UE at the paging occasions PO1, PO2 and PO3 illustrated in FIG. 2(*a*). In the example depicted in FIG. 2, it is assumed that at paging occasions PO1 and PO3 no paging message or paging signal for the UE is transmitted. However, at paging occasion PO2, the UE recognizes a paging message or paging signal for the UE and continues to listen to the paging signal. Thus, in accordance with conventional approaches, a UE waits and listens for possible paging signals periodically, and in case a paging signal arrives, the UE listens to the paging. More specifically, in case a paging signal arrives, the UE continues to receive until the paging signal is completely received. Thus, in case of a dual/multi-connection UE receiving a paging message on one connection, like at paging occasion PO2, results in a pause or interruption of the service on another connection that is longer when compared to the interruption at paging occasions PO1 and PO3.

In other words, one problem in a multi-connection UE having a single RF transceiver chain or sharing one of its RF transceiver chains among at least two connections is that the need for each connection to monitor the respective paging channel may lead to an overlap in the paging occasions which, in turn, may result in a delay or a loss of data on any of the connections. In other words, at least some of the connections may be associated with paging occasions that occur at the same time or that overlap, so that when being connected via the current connection to read the paging channel, the paging information on another paging channel for a non-current connection that occurs substantially at the same time, cannot be read by the UE and is lost. Therefore, data may be lost because the other connection is not aware that data is to be sent via this connection or at least a delay in receiving the data may occur until the paging channel can be read by the other connection.

Another issue regarding multi-connection UEs is the above-mentioned service interruption. For example, when considering the current connection to the network entity which is in the RRC connected state, and in case it is needed that also the other connections monitor their paging occasion or monitor system information, the UE may abruptly tune away from the network entity to which it is currently connected and by which the UE is currently served via the current connection. The tuning away may include that the UE connects to another network entity using another one of the shared connections to perform the paging or system information update using the other one of the connections sharing with the current connection the RF transceiver chain of the multi-connection UE. This leads to a service interruption on the current connection which, in turn, may lead to an unexpected behavior in the network.

In other words, when an operation is to be performed at a certain operation occasion on another one of the connections which is not the current connection, the UE tunes away from the current connection to be in active or connected state to another network entity via the other connection to allow to perform the certain operation at the operation occasion or time. This may also be referred to as the UE temporarily tuning away from the current connection and returning to the current connection after completing the operation on the other connection.

The service interruption may lead to an undesired error situation at the network entity because the time that the UE is catering to the services or operations using another one of the non-current connections, this, conventionally, leads to an error case for the serving network entity because the serving network entity is not aware of the UE procedure and the type of operations using the other connections. Thus, the network entity may continue scheduling resources for a connection to the temporarily suspended connection because of the tune away which leads to a waste of resources which cannot be used for connections to other UEs in the wireless system, and also an unexpected behavior may result since the current connection may except some control information, e.g. PUCCH, and/or a data transmission, e.g. PUSCH, from the UE. For example, if the UE does not transmit a PUCCH, the HARQ state of previous transmissions stays unclear. In the worst scenario, the gNB may falsely detect a PUCCH transmission including HARQ feedback and interpret a false acknowledgement for the previous transmissions.

As mentioned above, the above problems may not only arise when reading the paging channel of the respective systems or networks to which the connections sharing the RF transceiver chain are connected, but it may also occur for the above-summarized operations needing the one or more other connections which are in the idle state or in the inactive state to connect to the entities which serve the UE via the respective connection to obtain information or data. In other words, the situation that certain operations at certain occasions need to be carried out on the different connections that share a RF transceiver chain in the UE may result in situations in which the respective occasions overlap so that only one of the connections can receive the information and/or it may lead to a service interruption of the current operation.

In the above description reference has been made to dual/multi-connection user devices, however, also for single-connection user devices, like a single-sim UE, for UEs including one or more transceiver chains, also referred to as full duplex transceivers, allowing to simultaneously receive and transmit on one or more connections to the one or more wireless communication systems. For example, such UEs performing all operation requests as issued by the wireless communication network in which the UE is located, may not be desired. For example, there may be specific situations in which also a single-sim UE does not wish to receive at least certain operation requests from the network, independent from whether the UE is an RRC_IDLE/RRC_INACTIVE state or in an RRC_CONNECTED state. The operation request may relate to those operations mentioned above, and when considering, for example, the paging mechanism, a UE has to monitor all paging occasions independent of, for example, its battery status and the constant need to monitor the paging occasions may eventually drain the battery. In accordance with other examples, a user of a UE may be in a certain situation, like in a working environment, in which the user does not wish the UE to handle certain operation requests from the network, which he wishes to only receive when not being in the working environment. The drawback of conventional approaches is that neither a single-sim UE nor a dual/multi-sim UE is allowed to suppress certain operation requests from the network, like a paging message, to improve the energy efficiency and/or to limit the UE functionality to desired operations within certain time periods.

The present invention addresses the above-discussed issues and provides improvements and enhancements for the operation of multi-connection UEs within one or more wireless communication systems or networks.

Figure 1B:
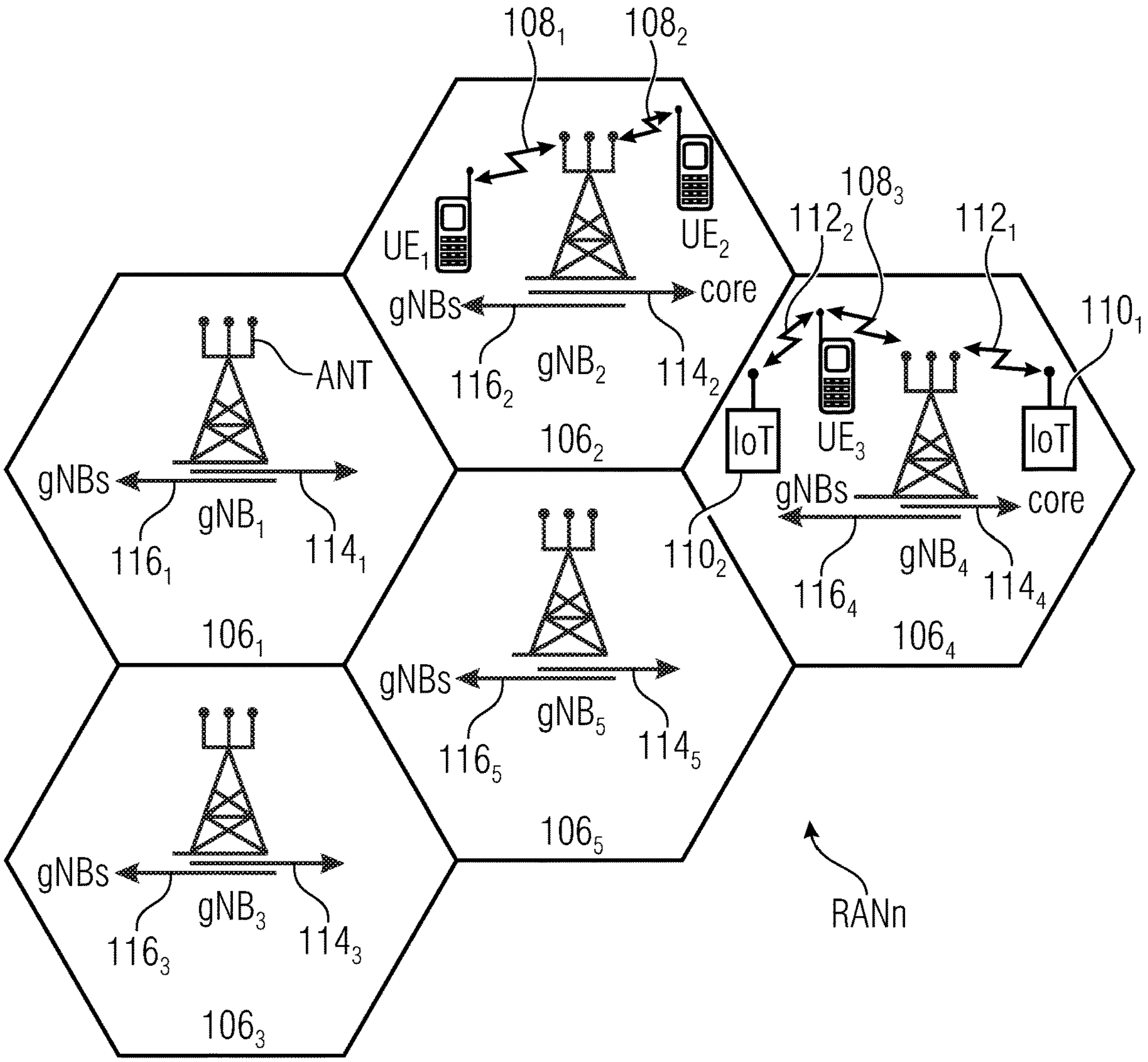
Figure 3:
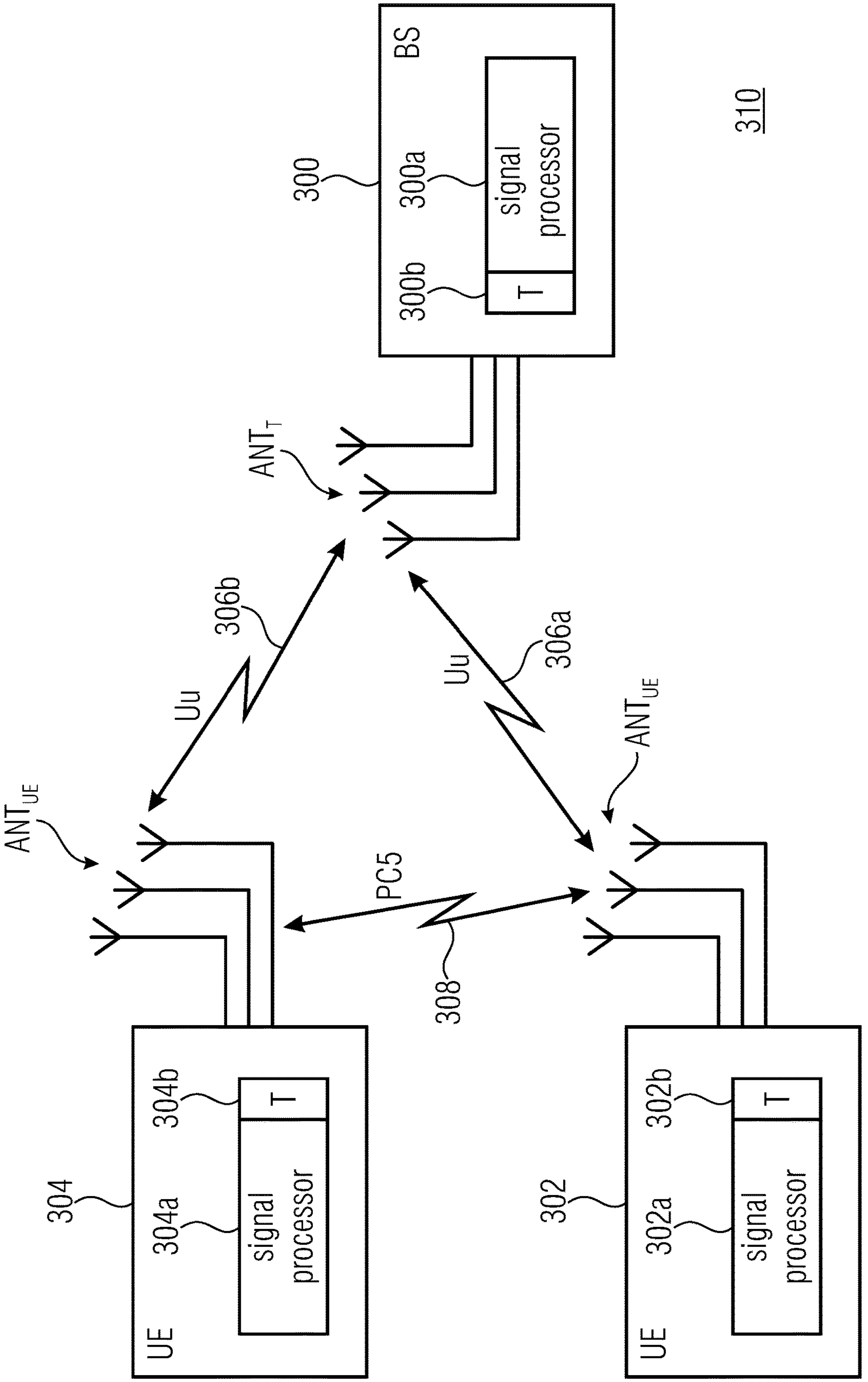
FIG. 3 is a schematic representation of a wireless communication system including a transmitter, like a base station, and one or more receivers, like user devices, UEs.

Embodiments of the present invention may be implemented in a wireless communication system as depicted in FIG. 1 including base stations and users, like mobile terminals or IoT devices. FIG. 3 is a schematic representation of a wireless communication system including a transmitter 300, like a base station, and one or more receivers 3021 to 302*n*, like user devices, UEs. The transmitter 300 and the receivers 302 may communicate via one or more wireless communication links or channels 304*a*, 304*b*, 304*c*, like a radio link. The transmitter 300 may include one or more antennas $ANT_T$ or an antenna array having a plurality of antenna elements, a signal processor 300*a* and a transceiver 300*b*, coupled with each other. The receivers 302 include one or more antennas $ANT_R$ or an antenna array having a plurality of antennas, a signal processor $\mathbf{302}a_1$, $\mathbf{302}a_n$, and a transceiver $\mathbf{302}b_1$, $\mathbf{302}b_n$ coupled with each other. The base station 300 and the UEs 302 may communicate via respective first wireless communication links 304*a* and 304*b*, like a radio link using the Uu interface, while the UEs 302 may communicate with each other via a second wireless communication link 304*c*, like a radio link using the PC5 interface. When the UEs are not served by the base station, are not be connected to a base station, for example, they are not in an RRC connected state, or, more generally, when no SL resource allocation configuration or assistance is provided by a base station, the UEs may communicate with each other over the sidelink. The system, the one or more UEs 302 and the base stations 300 may operate in accordance with the inventive teachings described herein.

User Device

The present invention provides a user device, UE, for a wireless communication system, wherein the UE is to signal to the wireless communication system information enabling a network entity of the wireless communication system to decide how to handle one or more incoming operation requests for the UE.

The present invention provides a user device, UE, for one or more wireless communication systems, the UE comprising:

- one or more transceiver chains,
- wherein the UE is to share at least one transceiver chain with at least two connections to the one or more wireless communication systems, and
- wherein the UE is to signal to the wireless communication system information enabling a network entity of the wireless communication system to decide how to handle one or more incoming operation requests for the UE.

In accordance with embodiments, the UE is to provide for an identification, e.g., a unique identification or ID, of the respective connections to the one or more wireless communication systems, the identification including one or more of the following:

- one or more Subscriber Identity Module, SIM cards, each SIM card associated with one of the connections,
- one or more universal Subscriber Identity Module, USIM cards, each USIM card associated with one of the connections,
- one or more universal integrated circuit cards, ICCs, each ICC associated with one of the connections,
- one or more embedded Subscriber Identity Modules, eSIMs, each eSIM associated with one of the connections,
- one or more certificates, each certificate associated with one of the connections,
- one or more pairs of username and password, each pair associated with one of the connections,
- one or more International Mobile Station Equipment Identities (IMEI) each associated with one of the connections,
- one or more Mobile Equipment Identifiers (MEID) each associated with one of the connections.

In accordance with embodiments, network entities, to/from which the UE is to transmit/receive using the respective connections, belong to the same mobile network operator, MNO, or to different mobile network operators, MNOs.

In accordance with embodiments, the UE is to signal the information about one or some or all connections.

In accordance with embodiments, the UE is to signal the information in case one, some or all connections are in the RRC_IDLE state or in the RRC_INACTIVE state.

In accordance with embodiments, the UE is to signal the information for one, some or all of the connections being in the RRC_IDLE state or in the RRC_INACTIVE state.

In accordance with embodiments, the UE is to signal the information for one, some or all of the connections being in the RRC_CONNECTED state.

In accordance with embodiments, the operation request concerns an operation including one or more of the following:

- receiving RAN-based notification area (RNA) updates,
- reading a paging channel during a paging occasion, PO,
- reading a PDCCH monitoring occasion, MO.

In accordance with embodiments, to handle an incoming operation request for the UE, the network entity is to allow or to prevent the incoming operation request to be transmitted to the UE.

In accordance with embodiments, the information indicates one or more conditions on the basis of which the network entity is to handle an incoming operation request for the UE.

In accordance with embodiments, the one or more conditions indicate that only certain operation requests are to be forwarded to the UE, like operation requests defined by the UE or emergency paging messages.

In accordance with embodiments, the one or more conditions include one or more of:

a quality of service, QoS, of an application, a priority of an application, a traffic type, like data, call, SMS, emergency, a traffic direction, like UL or DL.

In accordance with embodiments, the UE is to signal the information in case the UE is in a certain state, like a power saving state.

In accordance with embodiments, the information includes one or more user profiles, like a UE user preferred paging profile, UPPP, and/or profile conditions, like UPPP conditions, UPPPC.

In accordance with embodiments, the one or more user profiles include a work profile indicating one or more first operations to be accepted or rejected during a first time period, like the working time of a user of the UE, and an off-work profile indicating one or more second operations to be accepted or rejected during a second time period, like the time when a user of the UE is off work, the first and second operations being different, at least in part.

In accordance with embodiments, the information is to be stored in the wireless communication system as a UE specific information, e.g., as a part of the UE context information that may be stored in a network entity using, e.g., the Unstructured Data Storage Function, UDSF.

In accordance with embodiments, the UE is to send the information via Non-Access Stratum, NAS, signaling or via Access Stratum, AS, signaling to a network entity.

In accordance with embodiments, the network entity includes the Access and Mobility Function, AMF, or the Mobility Management Entity, MME of the core network of the wireless communication system.

In accordance with embodiments, the UE is to update the information at any time via, for example, NAS signaling.

In accordance with embodiments, the UE is not to update the information via, for example, NAS signaling, in case a time period since a last update is less than a configured or pre-configured threshold.

In accordance with embodiments, in case the UE is in the RRC_INACTIVE state or in the RRC_IDLE state, the UE is to piggyback the information over an RRC message sent by the UE, e.g., as part of the 4-step Random Access, RA, procedure or the 2-step RA procedure.

In accordance with embodiments, the UE is to signal the information using a specific RRC message type allowing a receiver, like a base station, to determine that no RRC related changes are needed and that the message only includes the piggybacked information to be processed at the receiver or to be forwarded to the core network of the wireless communication system.

In accordance with embodiments, in case the UE is in the RRC_CONNECTED state, the UE is to piggyback the information over an uplink message, like the ULInformationTransfer message over Signaling Radio Bearer 1, SRB1, or Signaling Radio Bearer2, SRB2.

In accordance with embodiments, responsive to sending the information, the UE is to receive a signaling indicating that the wireless communication system accepts or rejects the requested handling of the operation request for the UE.

In accordance with embodiments, in case no acceptation of the requested handling of the operation request for the UE is received responsive to sending the information, the UE is to maintain a current setting or profile, if any, regarding the handling of the operation request for the UE.

In accordance with embodiments, the UE is to receive a configuration message indicating updated settings of the handling of the operation request by the wireless communication system.

In accordance with embodiments, in case the wireless communication system rejects the requested handling of the operation request for the UE, the UE is to receive a cause for the rejection, e.g., an indication that the requested handling of the operation request is not allowed at all, e.g. the network does not support this operation, or is not possible for a certain time period after which the handling of the operation request may be requested again.

Network Entity

The present invention provides a network entity for a wireless communication system, the wireless communication system comprising one or more user devices, UEs, wherein the network entity is to decide how to handle one or more incoming operation requests for one or more user devices, UEs.

In accordance with embodiments, the network entity is to receive information, which enables the network entity to decide how to handle the one or more incoming operation requests for the UE, from one or more of the following:

the UE, another network entity of the wireless communication system, a network entity of a different wireless communication system, a storage, like the Unstructured Data Storage Function, UDSF.

In accordance with embodiments, the network entity is to signal to a source of the information whether a request or an update of the handling of one or more incoming operation requests for the UE is accepted or not.

In accordance with embodiments, in case the network entity does not accept the request or the update, the network entity is to send to the source of the request:

no acknowledgement message, or a non-acknowledgement message, a non-acknowledgement message and a cause of the non-acceptance, e.g., an indication that the requested or updated handling is not allowed at all or is not possible for a certain time period after which the handling may be requested again.

In accordance with embodiments, the network entity is to autonomously decide on the handling of an incoming operation request for the UE.

In accordance with embodiments, responsive an incoming operation request for the UE, dependent on the received information, the network entity is to allow or prevent the incoming operation request to be transmitted to the UE.

In accordance with embodiments, the network entity is to check a condition of an incoming operation request, and forward the incoming operation request, in case it satisfies the condition, or not forward the incoming operation request, in case it does not satisfy the condition.

In accordance with embodiments, the network entity is to signal to a source of an incoming operation request whether the incoming operation request is forwarded to the UE or not.

In accordance with embodiments, in case the network entity does not forward the incoming operation request to the UE, the network entity is to send to the source of the incoming operation request:

- no acknowledgement message, or
- a non-acknowledgement message,
- a non-acknowledgement message and a cause of not forwarding the operation request, e.g., an indication that the requested or updated handling is not allowed at all or is not possible for a certain time period after which the forwarding may be performed again.

In accordance with embodiments, during an activity window, the network entity is to pass to the UE some or all operation requests, and, outside the activity window, the network entity is to decide how to respond on behalf of the UE to an incoming operation request for the UE.

In accordance with embodiments, the activity window is configured by the network or is pre-configured.

In accordance with embodiments, the activity window is started responsive to a certain condition, like initiating a communication or an operation request passing in accordance with the information or the UE initiating a communication.

- use the received information to handle an operation request for the UE,
- provide the received information to other network functions, e.g., the Service Management Function, SMF, or the Policy Control Function, PCF,
- store the received information as part of the UE context, e.g., in the Unstructured Data Storage Function, UDSF.

In accordance with embodiments, the UE comprises the inventive UE.

In accordance with embodiments, the network entity comprises a base station, like a gNB, or a core network entity, like the Access and Mobility Function, AMF, or the Mobility Management Entity, MME of the core network of the wireless communication system.

In accordance with embodiments, the network entity comprises a core network entity, and wherein the core network entity is to receive the information from the UE via a base station, and to:

System

The present invention provides a wireless communication system, comprising one or more UEs, and one or more network entities, wherein one or more of the UEs comprises an inventive UE, and/or wherein one or more network entities comprises an inventive network entity.

In accordance with embodiments:,

- the UE comprises one or more of a mobile terminal, or stationary terminal, or cellular IoT-UE, or vehicular UE, or vehicular group leader (GL) UE, an IoT or narrowband IoT, NB-IoT, device, or a ground based vehicle, or an aerial vehicle, or a drone, or a moving base station, or road side unit, or a building, or any other item or device provided with network connectivity enabling the item/device to communicate using the wireless communication network, e.g., a sensor or actuator, and/or
- the network entity comprises one or more of a macro cell base station, or a small cell base station, or a central unit of a base station, or a distributed unit of a base station, or a road side unit, or a UE, or a group leader (GL), or a relay, or a remote radio head, or an AMF, or an SMF, or a core network entity, or mobile edge computing entity, or a network slice as in the NR or 5G core context, or any transmission/reception point, TRP, enabling an item or a device to communicate using the wireless communication network, the item or device being provided with network connectivity to communicate using the wireless communication network.

Method

The present invention provides a method for operating a wireless communication system, the method comprising:

- signaling, by a user device, UE, to the wireless communication system information enabling a network entity of the wireless communication system to decide how to handle one or more incoming operation requests for the UE,
- wherein the UE is a single-connection UE or a multi-connection UE, the multi-connection UE including one or more transceiver chains, wherein at least one transceiver chain is shared by at least two connections to the one or more wireless communication systems.

The present invention provides a method for operating a wireless communication system, the method comprising:

- deciding, by a network entity of the wireless communication system, how to handle one or more incoming operation requests for one or more user devices, UEs, of the wireless communication system.

Computer Program Product

The present invention provides a computer program product comprising instructions which, when the program is executed by a computer, causes the computer to carry out one or more methods in accordance with the present invention.

Embodiments of the present invention are now described in more detail with reference to the paging mechanism as employed in wireless communication systems, like the one described with reference to FIG. 1. However, it is noted that the present invention is not limited to such a paging mechanism, rather, the inventive approach as described in detail below may equally be applied for handling any other operation requests, like a request associated with those operations indicated above.

To address the problems and drawbacks in conventional approaches needing a user device to constantly monitor the network for certain operation requests, like a paging request, in accordance with the present invention, the network is enabled handle one or more incoming operation requests for the UE. For example, the UE may signal to the network that for one or more incoming operation requests, the network is to make a decision how to handle such an incoming request, like an incoming paging message. In other words, in accordance with the inventive approach, the transmission of operation requests, like paging messages, to the UE may be limited or reduced to a certain extent, e.g., as defined by the UE. At the network side, in case an operation request is received, like a certain paging message, dependent on requirements or a profile as defined for the UE, the network side decides whether an operation request, like a paging request, is actually forwarded to the UE or not. This avoids the above problems, like the undesired tuning away of a multi-sim UE from a current connection to another connection for which a paging message is received and to be listened to for an extended period of time as illustrated in FIG. 2(*b*). In other words, the inventive approach avoids an extension of a tune-away time of a multi-sim UE from a current connection to another connection, and the tuning away time may be limited only to the time during which the paging occasions PO1, PO2 and PO3 occur. When considering FIG. 2, in accordance with embodiments of the present invention, the UE may signal that a certain paging message is not to be forwarded to the UE by the network so that, other than in FIG. 2(*b*), at paging occasion PO2 the UE on the other connection still monitors the paging occasion but there is no paging message received so that the length by which the UE is tuned to the different connection is reduced to the monitoring length of the paging occasion. In a similar way, the multi-sim UE or a single-sim UE may reduce the number of paging messages to be processed at the UE by avoiding paging messages or paging signals to be forwarded to the UE thereby avoiding the need to process the signals and to decide whether any action needs to be taken or not at the UE side, thereby reducing power consumption associated with the processing of the received paging signal. In other words, this processing is shifted from the UE toward the network that, responsive to the information indicating, for example, a desired profile, like a user profile, whether a paging signal is to be forwarded to the UE or not.

Thus, the present invention is advantageous as it allows a more flexible use of a user device, either multi-sim or single-sim, reduces, in case of multi-sim UEs, the tune-away time from a current connection to another connection to the monitoring time for monitoring a certain paging occasion, allows the UE to operate in accordance with certain user demands or user desires, and allows reducing power consumption if desired. In other words, in accordance with the present invention, to enhance the handling of operations at a UE, like to enhance the paging mechanism for a single/multi-sim UE, the network, like the corresponding network entities, may be enabled to make the decision how to handle to an incoming request, like an incoming paging message, for a UE.

Figure 4:
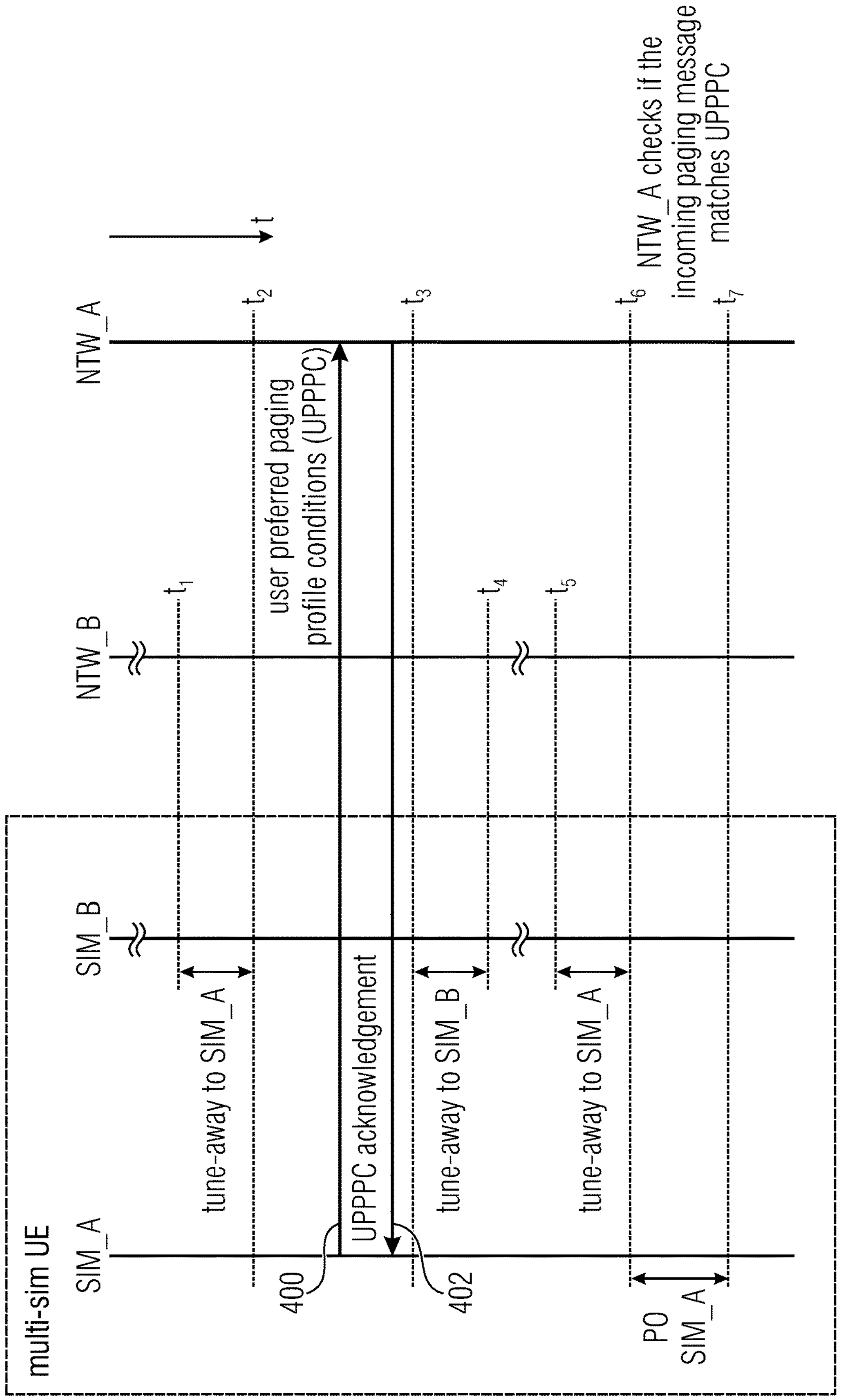
FIG. 4 illustrates an embodiment of the present invention in accordance with which a multi-sim UE signals information to the wireless communication network enabling the network or a network entity to make the decision how to handle an incoming paging message.

FIG. 4 illustrates an embodiment of the present invention in accordance with which a multi-sim UE signals information to the wireless communication network enabling the network or a network entity to make the decision how to handle an incoming paging message. FIG. 4 illustrates the multi-sim UE 400 which, in the depicted embodiment, includes two connections or sim cards SIM_A and SIM_B. However, the subsequently described principles underlying the present invention equally apply to a single-sim UE or to a multi-sim UE having more than two connections. Further, it is assumed that UE 400 is connected to a first wireless network NTW_A via the first connection SIM_A and to a second network NTW_B via a second connection SIM_B. Initially, at a time before t1, the multi-sim UE is connected by its second connection SIM_B to the second network NTB_B. At time t1, the multi-sim UE tunes away from the second connection SIM_B to the first connection SIM_A so that starting a time t2, the multi-sim UE is connected to the first network NTW_A using its first connection SIM_A. While being connected to the first network NTW_A using the first connection SIM_A, the multi-sim UE, in accordance with embodiments of the present invention, may signal 400 information to the network enabling the network entities of the first network NTW_A to make a decision how to handle an incoming paging message for the multi-sim UE to which the paging message is directed. In accordance with embodiments described in more detail below, the multi-sim UE may transmit a profile indicating operation requests and/or conditions to allow the network NTW_A to handle a corresponding incoming request accordingly.

For example, when considering embodiments addressing the paging mechanism, at 400, the multi-sim UE may transmit a user preferred paging profile UPPP, together with respective user preferred paging profile conditions, UPPPC, as is discussed in more detail below. In accordance with further embodiments, the network NTW_A may send a UPPPC acknowledgement 402 to the multi-sim UE. Thus, once the profile has been received at network NTW_A, the network NTW_A is in a position to evaluate whether any incoming requests for certain operations, like incoming paging requests or incoming paging messages for the first connection SIM_A, are to be forwarded to the multi-sim UE or not.

In the embodiment depicted in FIG. 4, at a time t3, the multi-sim UE tunes away from the first connection SIM_A and back to the second connection SIM_B so that at a time t4, the multi-sim UE is again connected via the second connection SIM_B to the second network NTW_B. At a later time t5, the multi-sim UE may again tune-away from the second connection SIM_B and back to the first connection SIM_A, to monitor a paging occasion PO SIM_A between times t6 and t7 for potential paging signals or paging messages directed to the first connection SIM_A of the multi-sim UE. On the basis of the information 400, the network NTW_A, during the paging occasion PO SIM_A, is enabled to check an incoming paging message to see whether it matches the information received at 400, for example whether it matches a certain profile or a certain condition, like the user preferred paging profile condition. In case an incoming paging message matches a certain profile or condition, the network NTW_A prevents the incoming paging message from being transmitted to the multi-sim UE. Thus, despite the fact that from a network, a paging message is provided for the first connection SIM_A of the multi-sim UE, by signaling to the network that such a message is not be forwarded to the UE, a situation as in FIG. 2(*b*) at paging occasion PO2 is avoided and only the short tune-away time from t6 to t7 for monitoring the paging occasion of the first connection SIM_A occurs but not the longer period needed to listen to the actual paging message to be received. Thus, when implementing the inventive approach the tune-away time before the multi-sim UE may return to the second connection SIM_B after time t7, is substantially reduced.

In the embodiment described with reference to FIG. 4, the information about the handling of operational requests for the UE by the network is received by the UE. However, the present invention is not limited to such embodiments. In accordance with other embodiments, this information may be provided by other sources or may be configured in the system so as to allow a network entity to autonomously, i.e., without the need to communicate with the UE or other network entities, how to handle the one or more incoming operation requests for the UE. In accordance with embodiments, the network entity may receive the from another network entity of the wireless communication system, or form a network entity of a different wireless communication system, or from a storage, like the Unstructured Data Storage Function, UDSF. In other words, the network entity may decide using information it already has available, e.g., from the storage where the information was stored when the UE was connected at an earlier time, or on the basis of information received from/negotiated with another network entity of the same or a different network operator. In accordance with further embodiments, the network may use existing information, e.g., the knowledge that certain sim card(s) belong to the same device. In accordance with yet further embodiments, the network may monitor traffic patterns to/from the UE to make a decision about the handling of the operation requests, e.g., not passing low priority requests when the traffic is high, i.e., is above a configured or pre-configured threshold. In accordance with other embodiments, the network may make the decision based on a received transmit power from the UE, e.g., if the value is low the UE is on the cell edge and may need not be burdened with unnecessary information, e.g., low priority requests.

As mentioned above, the decision in the network or the network entity may be based on information for the UE, like a preferred user profile as chosen for the UE and communicated to the network or network entity, e.g., through signaling 400. In accordance with embodiments, in addition to the profile also conditions related to the user profile may be included in the signaling 400. The profile may indicate, in accordance with embodiments, what operation requests, like paging requests or paging messages are to be transmitted to the UE to indicate. For example, certain operation requests from certain entities, which are associated with certain services or applications, are not to be forwarded to the UE from the network, that at one time period only operation requests from a certain set of operation requests are to be forwarded while at a second time period operation requests of another set of operation requests are to be forwarded. For example, the different time periods may be a time when a user of the UE is at work and a time when the user of a UE is off work.

Further, respective conditions may be associated with the profile. An example of such a condition may be to consider a paging priority threshold that may be derived, for example, based on a received quality of service, QoS, and priority of an application run by the UE. This may be communicated to the network, and based on this criterion/threshold value, the network may decide to send a paging signal to a UE only in case the priority of an incoming paging message is greater than the threshold set by the UE, for example in the profile. The criteria on the basis of which the forwarding of a certain message, like a paging message to the UE may be decided, may be based on one or more of the following:

- the quality of service of an application run by the UE,
- a priority of the application run by the UE,
- a traffic type, like traffic associated with the data transfer, traffic associated with a call, traffic associated with the small message service, or traffic associated with an emergency,
- a direction of the traffic, for example an uplink traffic or a downlink traffic.

For example, when considering the traffic type, in certain situations, only data transfers and emergency messages may be forwarded to the UE, for example when the user wishes not be disturbed, for example when being at work. At other times, for example during a lunch break or when being off work, also traffic associated with a call may be forwarded. Further, traffic associated with emergency situations may be forwarded in accordance with embodiments.

Figure 5A:
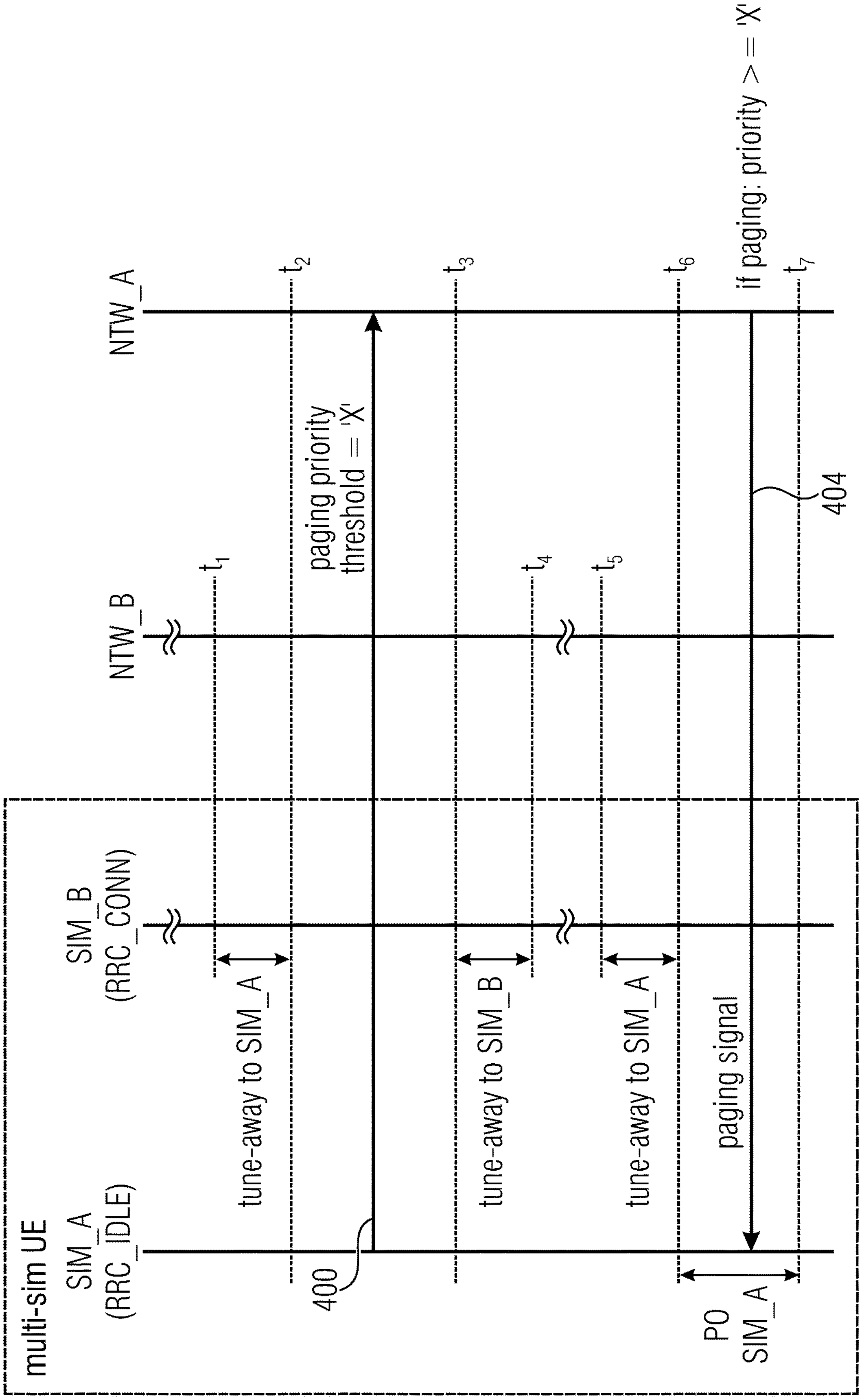
FIG. 5*a-c* illustrates an embodiment of the present invention employing a paging priority threshold to allow a network to decide whether a certain paging message is to be forwarded to a UE or not.
Figure 5B:
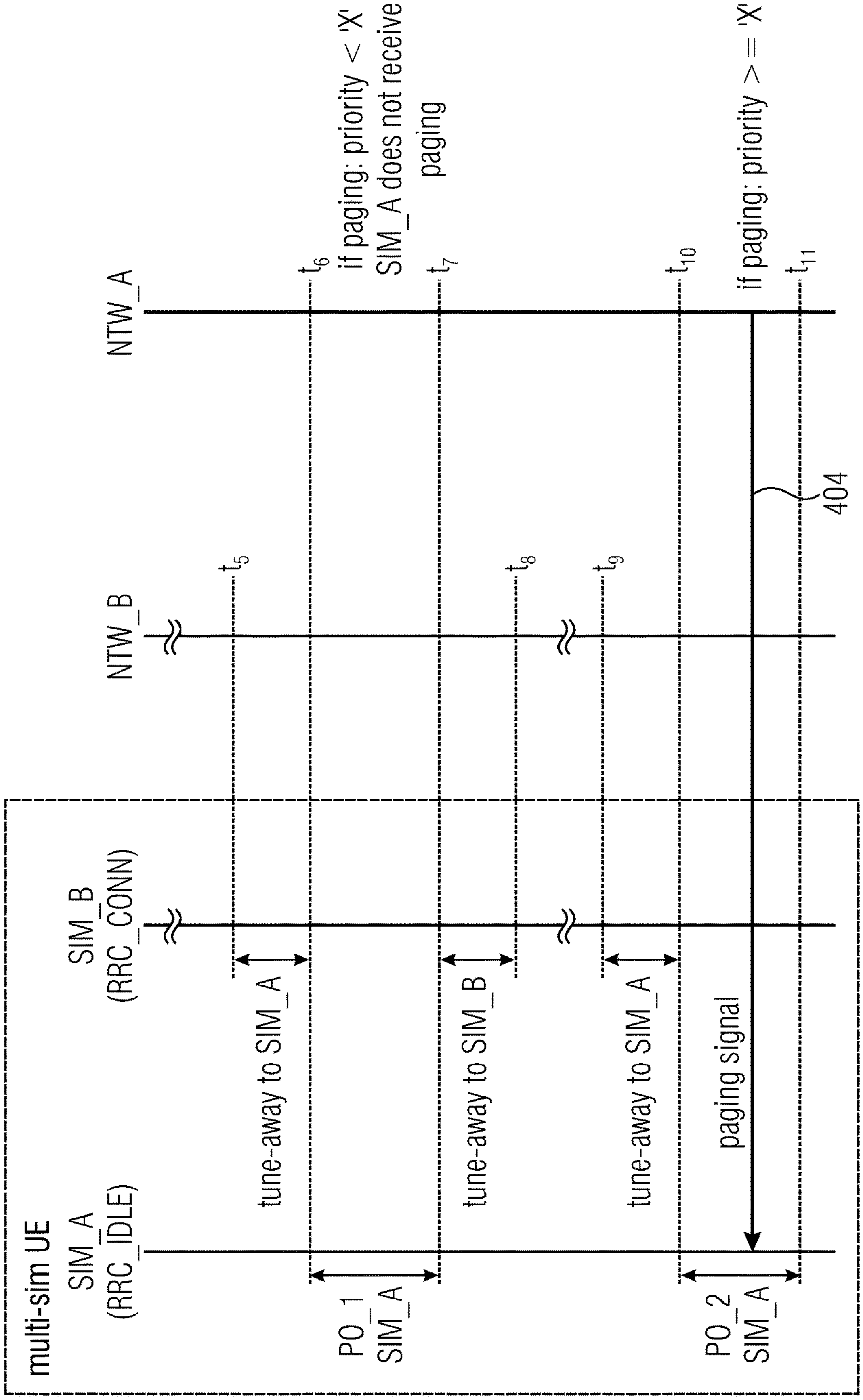
Figure 5C:
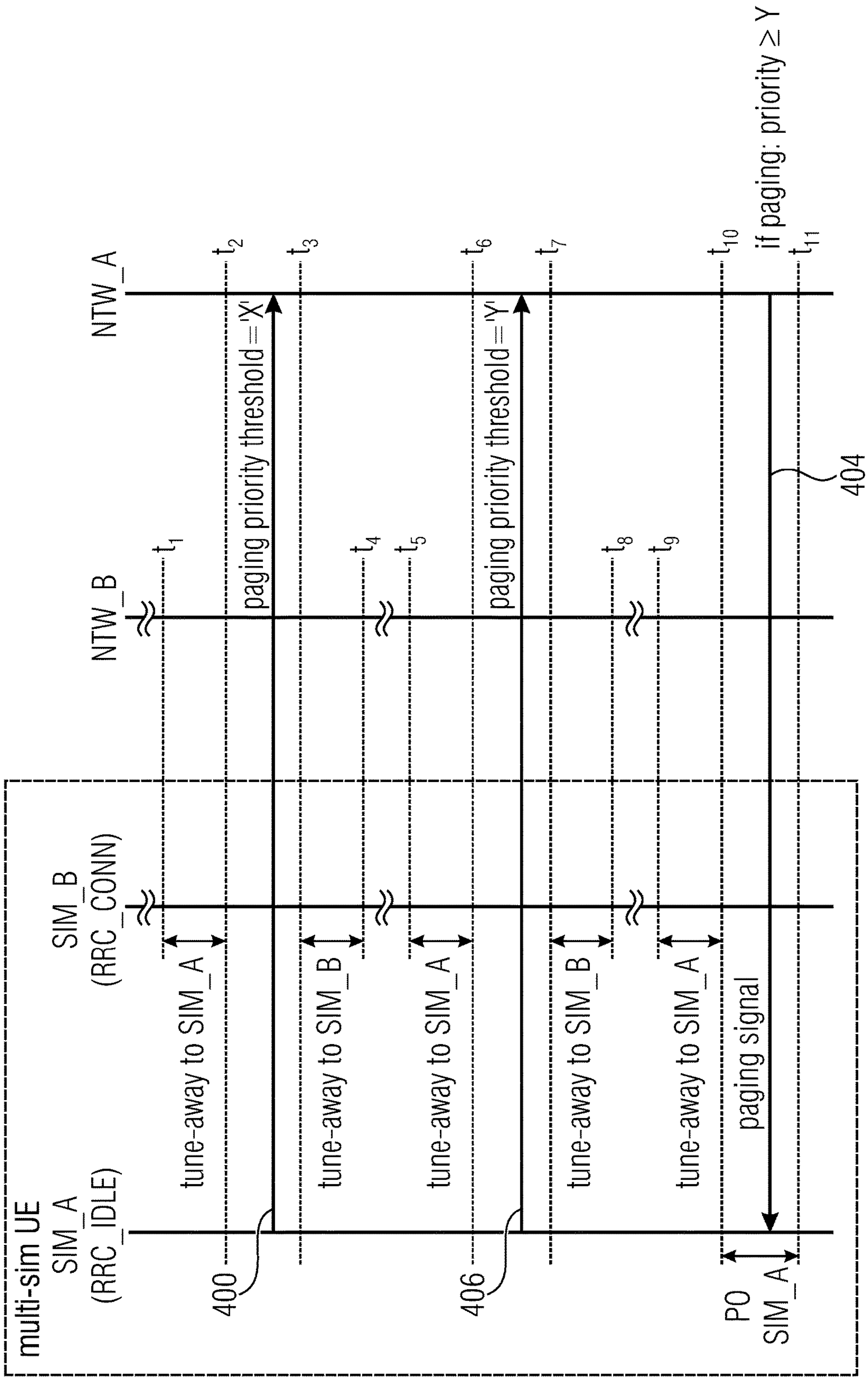

FIG. 5 illustrates an embodiment of the present invention employing a paging priority threshold to allow a network to decide whether a certain paging message is to be forwarded to a UE or not. In FIG. 5, those elements already described with reference to FIG. 4 have assigned the same reference signs and are not described again, rather, reference is made to the above-description of FIG. 4. Again it is assumed that the multi-sim UE has two connections SIM_A and SIM_B, of which the second connection SIM_B is in the RRC_CONNECTED state to the second network NTW_B, and the first connection SIM_A is in the RRC_IDLE state. Between times t2 and t3 as well as between times t6 and t7 the UE tunes-away from the RRC_CONNECTED connection SIM_B to the first connection SIM_A to allow the UE to signal via the first connection, for example in a way as described in more detail below, the information 400 about paging messages not to be forwarded to the first connection. In accordance with embodiments of the invention, this transfer of information or signaling at 400 may be performed with the first connection being in the RRC_IDLE state. In the embodiment of FIG. 5(*a*) the information 400 signals to the network NTW_A a certain paging priority threshold X which is stored at the network and used by the network to evaluate incoming paging messages to see whether a paging priority thereof is greater than or equal to the priority or less than a priority. At the next paging occasion PO SIM_A of the first connection SIM_A a paging message exists that is to be forwarded to the first connection, and since the second network NTW_A determines that the paging threshold of the incoming paging message is greater than the threshold X, the actual paging signal 404 is forwarded to the first connection SIM_A of the multi-sim UE so that the multi-sim UE, using the first connection, listens to the paging signal in a way as illustrated in FIG. 2(*b*) at paging occasion PO2.

FIG. 5(*b*) illustrates the threshold check over different paging occasions and starts at a time t6 assuming that the network NTW_A has already been informed by the first connection SIM_A about a priority threshold for the paging messages. FIG. 5(*b*) shows the two paging occasions PO_1 SIM_A and PO_2 SIM_A between times t6 and t7 and between times t10 and t11, respectively, during which it is assumed that the network NTW_A monitors a paging priority threshold of any incoming paging message for the first connection SIM_A. In the embodiment of FIG. 5(*b*), it is assumed that at the first paging occasion PO_1 SIM_A the network NTW_A determines that the paging priority of an incoming message is less than the threshold so that, as is depicted, there is no signaling from the network NTW_A to the first connection SIM_A thereby reducing the tune-away time to the paging occasion duration as indicated in FIG. 2(*b*) at paging occasions PO1 and PO3. On the other hand, at paging occasion PO_2 SIM_A the network NTW_A determines that an incoming message has a paging priority greater than the threshold so that during this period, in a similar way as depicted in FIG. 5(*a*) the paging signal 404 is transmitted to the first connection SIM_A.

FIG. 5(*c*) illustrates a further embodiment employing a paging priority threshold in accordance with which an initial threshold is updated. In FIG. 5(*c*), in a similar way as in FIG. 5(*a*), initially the paging priority threshold X is signaled from the first connection SIM_A to the first network NTW_A between the times t2 and t3 during which the multi-sim UE tuned-away from the RRC_CONNECTED connection SIM_B to the RRC_IDLE connection SIM_A. During a next period between times t6 and t7 during which the multi-sim UE is again tuned-away from the second connection SIM_B to the first connection SIM_A, the multi-sim UE may send an update message 406 forwarding an updated threshold value, like a new paging priority threshold Y to the network NTW_A so that at the paging occasion PO SIM_A between times t10 and t11 during which the first connection monitors the paging occasion the network NTW_A may transmit the paging signal 404 that is incoming because its threshold is greater than the updated threshold Y.

As is shown in FIG. 5, by restricting the paging messages to the first connection SIM_A, which is in the RRC_IDLE state, the overall service interruption time for the second connection SIM_B, which is in the RRC_CONNECTED state, may kept to a minimum. Thus, other than existing or conventional approaches, like the current 3GPP specifications in accordance with which the UE is mandated to handle a paging message even if the UE choses eventually to prioritize the other sim-card or connection in the RRC_CONNECTED state, in accordance with the present invention, the increase in the overall interruption time as it is experienced in conventional approaches, is avoided. The UE may ask the network to forward only certain paging messages which meet the certain criteria to the UE, introducing the number of paging messages received by the UE which, in turn, reduces the overall interruption time.

As mentioned above, in accordance with embodiments, the information 400 (see FIG. 4 for example) forwarded to the wireless communication network by the single/multi-sim UE indicating how to handle an incoming paging message for the UE may be in the form of a user preferred profile, like a user preferred paging profile associated with respective conditions referred to as UPPP conditions, UPPPC. In the following, on the basis of embodiments employing a user preferred paging profile the signaling of such information to the network, for example as described above with reference to FIG. 4 and FIG. 5 at 400, is described in more detail. However, it is noted that the present invention is not limited to a user preferred paging profile, rather, any user profile indicating a preferred handling of certain operation requests received at the network may be employed together, if desired, with further conditions related to the profile.

The information or the profile, like the UPPPC may be stored, after being received at the network, like network NTW_A, as a UE-specific information, for example as a part of the UE context information. The UE context information may be stored in a network entity of the core network of the wireless communication system, for example by employing the unstructured data storage function, UDSF.

In accordance with embodiments, the UPPPC may be sent by the UE to the network via a non-access stratum, NAS, signaling to allow a UE, like a single-sim UE being in the RRC_IDLE state or in the RRC_INACTIVE state, or a connection of a multi-sim UE being in the RRC_IDLE or the RRC_INACTIVE state to signal the information or profile or the profile conditions to the network without the need for switching to the RRC_CONNECTED state. For example, the UPPPC may be sent by the UE to the network via the non-access stratum, NAS, signaling, for example to the access and mobility function AMF of a 5G core network, 5GC, or to the mobility management entity, MME, of an evolved packet core, EPC. For example, in case of a 5GC, the AMF may receive the UPPPC. The AMF may then use the information provided by the UPPPC, may provide it to other network functions, like the service management function, SMF, or the policy control function, PCF, for use by these functions, or may store the information provided by the UPPPC as part of the UE context in the USDSF. In accordance with other embodiments, the UPPPC may be sent by the UE to the network via a access stratum, AS, signaling The UPPPC, as already described above, may be dynamic in nature and may be updated at any time, e.g., via NAS or AS signaling. In accordance with embodiments, to prevent the UE from requesting a change for the UPPPC too often, the update may only be allowed once a certain time period since a last update expired, for example once a prevent timer expired. The prevent timer may be set to a certain value and during the period of the prevent timer, the UE is not allowed to request any changes to the UPPPC. The prevent timer may be implemented at the UE side so that the UE already knows that no update is possible, or it may be implemented at the network side so that a network entity receiving a UPPPC update message may check whether an update is already allowable and, if not, maintains the current profile and, optionally, informs the UE accordingly.

For example, when requesting an update during the duration of the prevent timer, the UE may receive a non-acknowledgment message from the network indicating that the update has not been accepted so that the UE is aware that the currently used non-update profile is still in force. In accordance with other embodiments, rather than signaling a reject or non-acknowledgement of the update, the network may signal nothing back to the UE in response to the update, and the UE, expecting to receive an acknowledgement or acceptance of the update, once this has not been received within a certain time period, is aware that the update has not been accepted and therefore is also aware that the currently used non-updated profile is maintained. On the other hand, in case the update is accepted by the network an acknowledgment or acceptance message may be sent to the UE so that the UE is aware that the new, updated profile is in force.

It is noted that the just described process for providing information from the network to the UE with regard to a profile may also be employed when transmitting the profile of the profile conditions for the first time to the network. The network may explicitly signal an acknowledgment or non-acknowledgment to inform the UE whether the profile/profile conditions are accepted or are not accepted. In other embodiments, the network may only send the acknowledgment so that the UE, once an acknowledgment is not received within a predefined time period, is aware that the requested profile/condition are not accepted and used at the network side.

In accordance with embodiments, when considering a 5GC, the overall link between the AMF and the UE is called the N1 interface. In case the UE, namely a single-sim UE, or one connection of a multi-sim UE is in the RRC_IDLE state, to achieve the NAS signaling, dedicated NAS information may be piggybacked over an RRC message sent from the UE to the gNB. This dedicated NAS information may be transparent to the lower layers, below the NAS layers, of the UE and the gNB and may be forwarded to the core network, for example to the AMF. In accordance with such embodiments, the information or the UPPPC is the dedicated NAS information included in the RRC message. The message containing the RRC and the piggybacked NAS information may be part of the four-step random access, RA, procedure or of the two-step RA procedure. In accordance with further embodiments, in case the UE or a connection of a multi-sim UE is in the RRC_CONNECTED state, the above-mentioned NAS information, namely the information about the handling of incoming operation requests may be piggybacked using an uplink message, like a UL information transfer message over the SRB1/SRB2.

Since the information concerning the handling of incoming operation requests, like incoming paging messages is piggybacked over an RRC message, according to the current specifications, like the 3GPP specifications, the UE may also request RRC level changes, like a setup-request/setup-complete, resume-request/resume-complete, reestablishment-request or system info-request on the SRB0/SRB1. However, the current specifications do not allow for RRC messages that do not include any RRC level change. In other words, it is not possible to perform only a NAS level change using a current set of existing RRC message types, namely the NAS level change indicating the handing of incoming operation requests for a certain UE or a certain connection in a multi-sim UE as discussed above. Therefore, in accordance with further embodiments, a new RRC message type is provided which may be referred to as RRC piggyback. When the UE sends this RRC piggyback message via NAS signaling, the receiver, either the gNB or the respective entities in the 5GC recognizes that there is no RRC related change needed and only the piggybacked information or data concerning the handling of the incoming operation requests is included which is processed either at the gNB itself or is forwarded to the 5GC.

FIG. 6 illustrates an RRC specification example for the common control channel, CCCH from the UE to the network including, as indicated at 410, as new UL-CCCH-message type the above described RRC piggyback request. Otherwise, the RRC configuration in FIG. 6 may correspond to the conventional RRC specification as it is described for example in the RRC protocol specifications—36.331 for legacy LTE, 38.331 for 5G NR. In accordance with the embodiment of FIG. 6, the RRC piggyback message type is included in the uplink common control channel message, however, in accordance with other embodiments, it may also be included in the uplink dedicated control channel, UL-DCCH, and FIG. 7 illustrates an RRC specification example for the indication of the new message 410 in the uplink from the UE towards the network using the DCCH.

Responsive to receiving the RRC message including the piggybacked NAS information at the gNB, the gNB may forward information regarding the requested handling of operation requests by the network using also an RRC message piggybacked with the dedicated NAS information the gNB received from the 5GC. For example, the gNB may use an existing message type having an RRC impact or it may use the RRC piggyback message type without RRC impact. FIG. 8 illustrates an example of RRC specifications including the new message type 410 for messages sent from the network to the UE, for example, in the downlink dedicated control channel, DL-DCCH.

Figure 9:
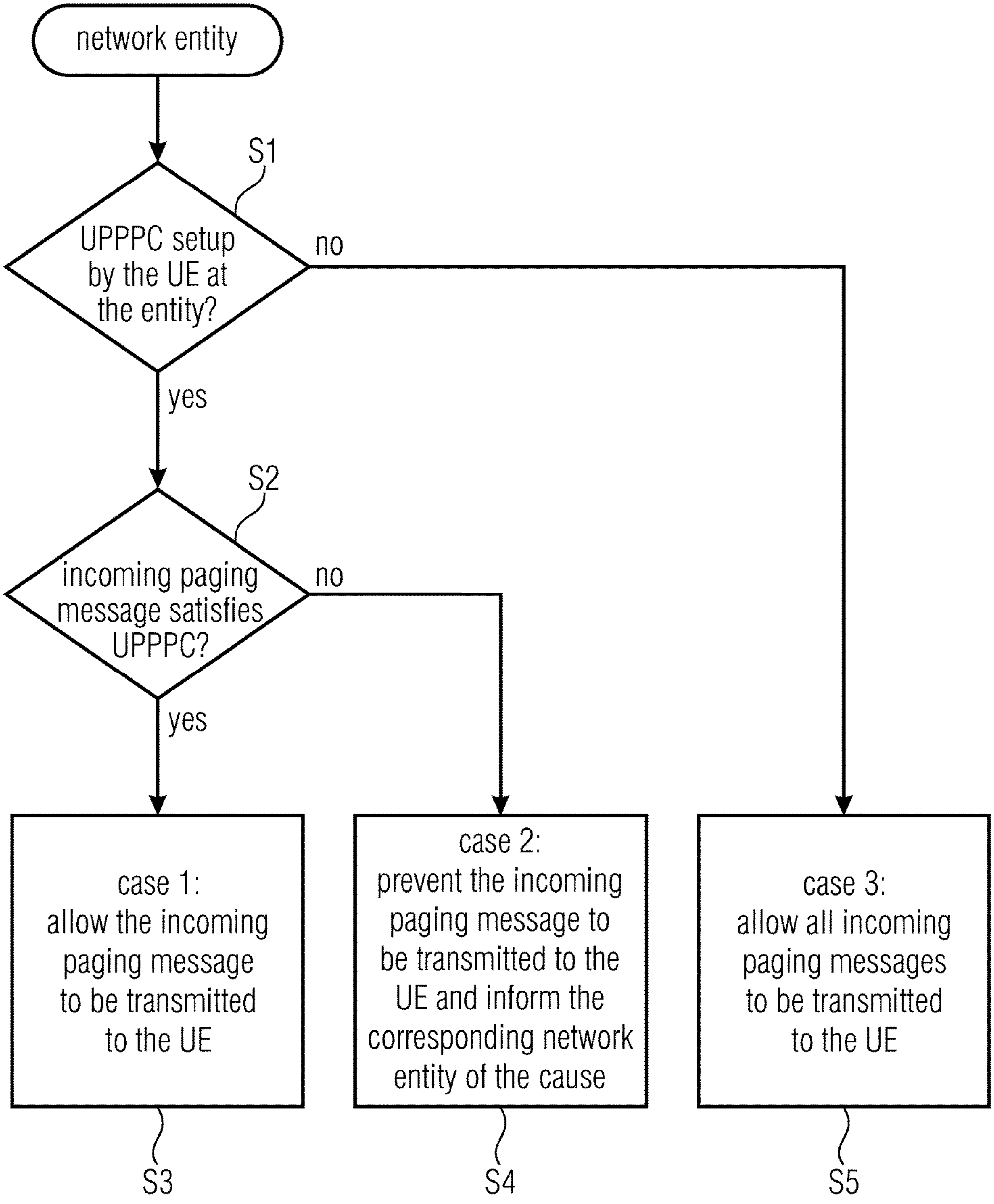
FIG. 9 illustrates an operation flowchart of a network entity, like the above-described AMF, operating in accordance with embodiments of the present invention.
Figure 10A:
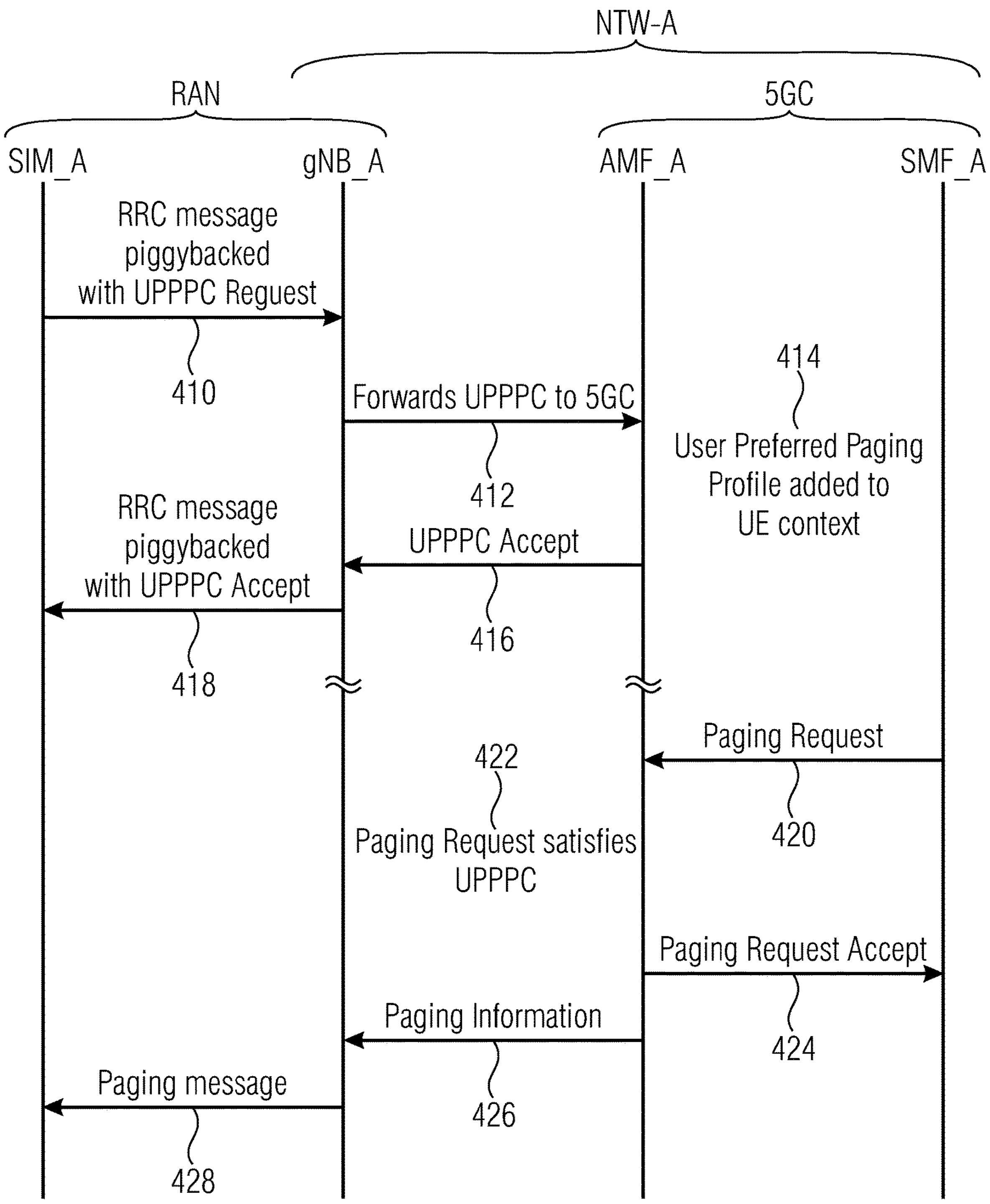
FIG. 10*a-e* illustrates embodiments for the transfer of a UPPPC request or the transfer of a UPPPC update request and the related procedures for a certain connection, like the first connection SIM_A of a multi-sim UE as illustrated in FIG. 4 and FIG. 5.
Figure 10B:
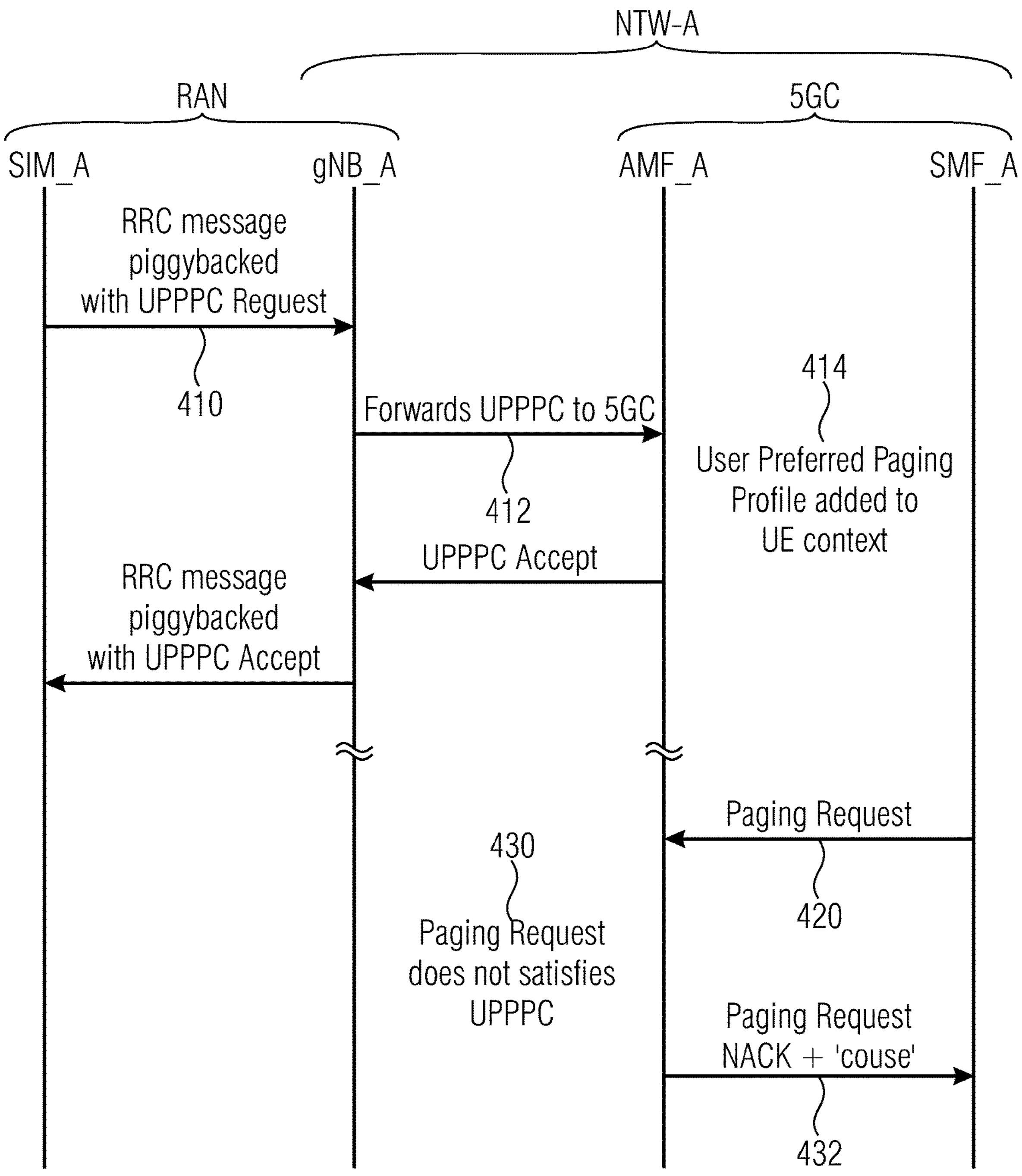
Figure 10C:
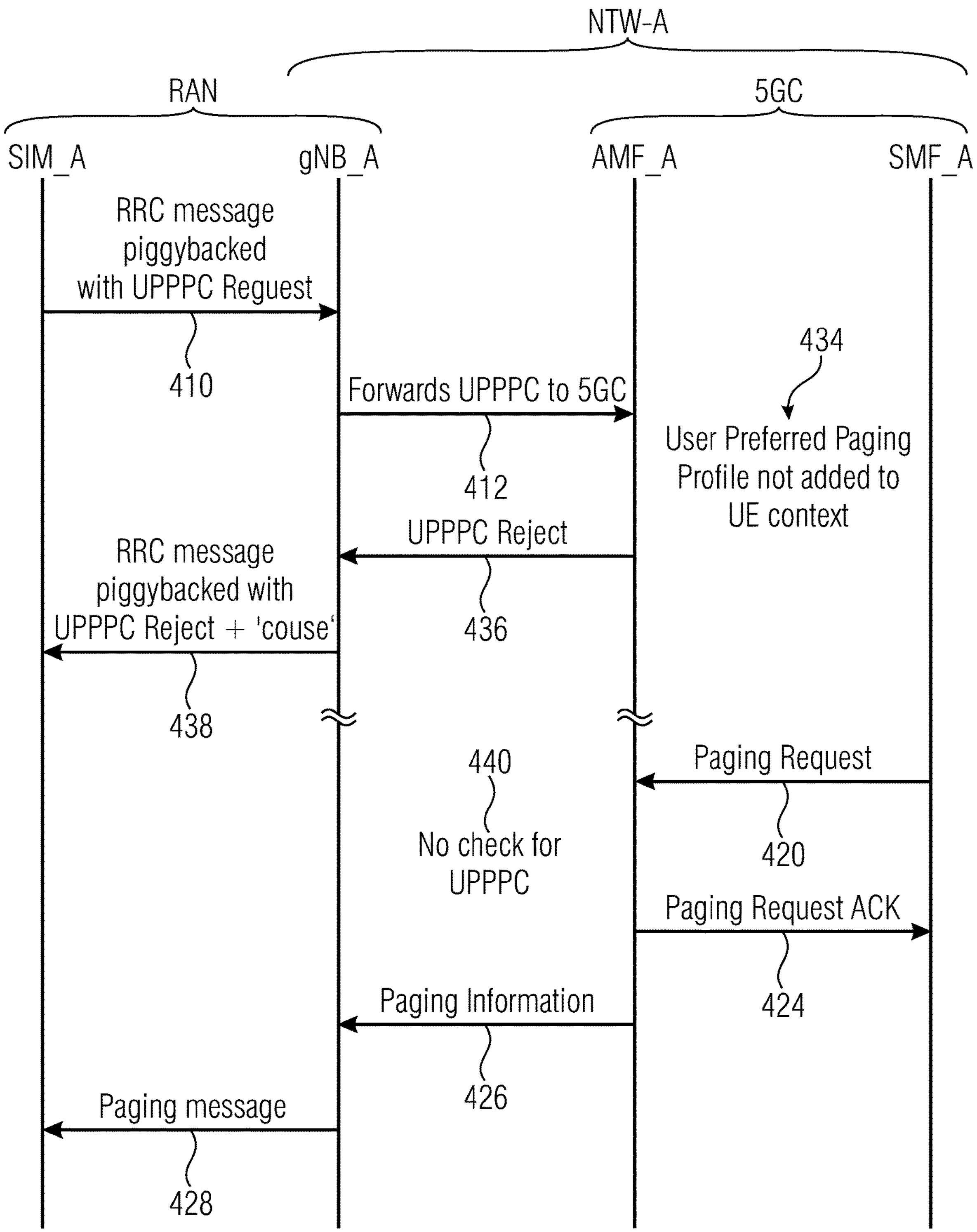
Figure 10D:
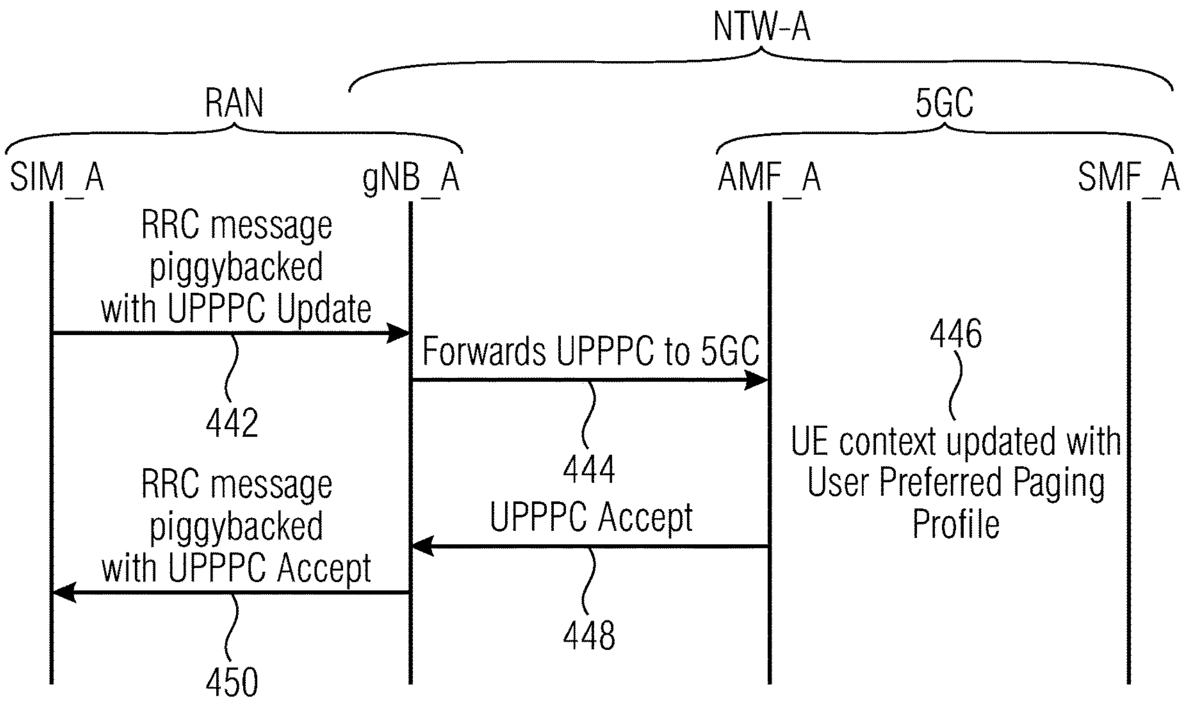
Figure 10E:
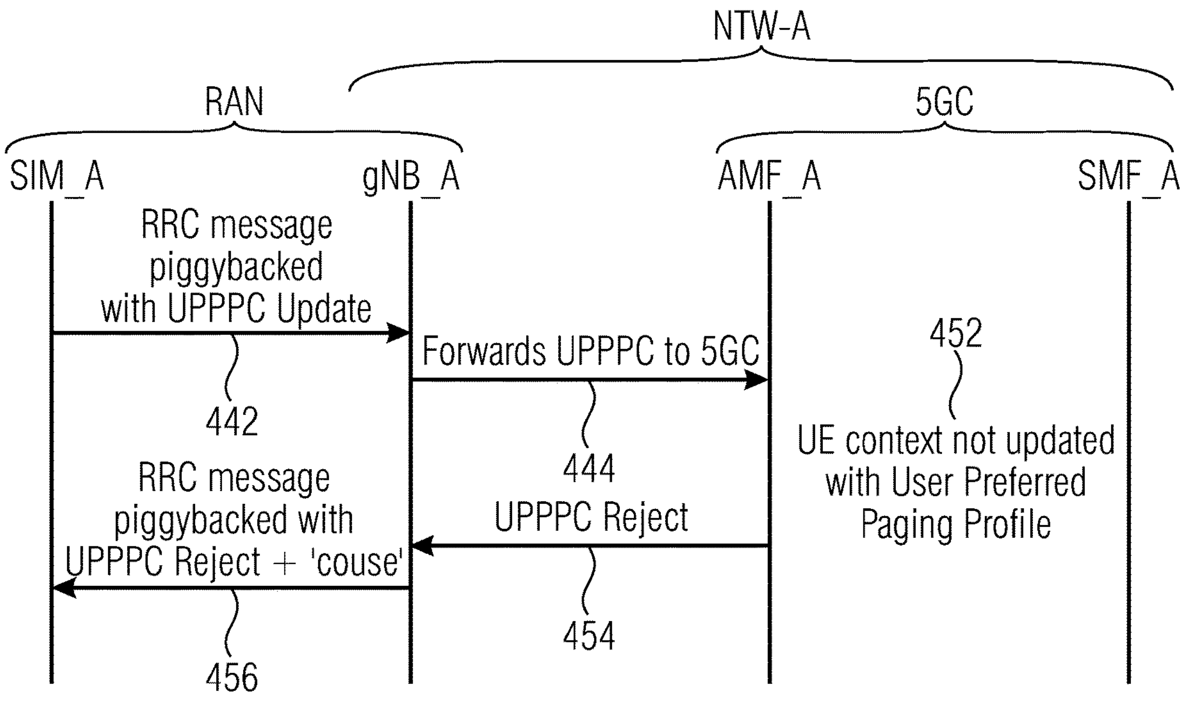

Responsive to receiving the information concerning the handling of incoming operation requests with regard to a UE or a multi-sim UE, like the above described UPPPC, the wireless communication system may decide how to handle an incoming request for the UE. FIG. 9 illustrates an operation flowchart of a network entity, like the above-described AMF, operating in accordance with embodiments of the present invention. The network entity determines at step S1 whether the UE has setup a UPPPC at the entity, for example by transmitting a respective information or message 400 as described above with reference to FIG. 4 and FIG. 5. In case it is determined at step S1 that such UPPPC is setup, at step S2 the network entity determines whether an incoming request, like an incoming paging message, satisfies the UPPPC. In case the incoming paging message satisfies the UPPPC, the network entity allows the incoming paging message to be transmitted to the UE, as is indicated at step S3 as case 1. On the other hand, in case it is determined at step S2 that the incoming paging message does not satisfy the UPPPC, the network entity prevents the incoming paging message to be transmitted to the UE, as is indicated at step S4 as case 2. In accordance with embodiments, the network entity may also inform the network entity from which the incoming paging message originated, of the cause of the rejection of the paging message thereby allowing, for example, an application to react to the situation, for example to exclude the UE from its services or the like. For example, the application may try to provide the service to the UE after a time period as deemed needed by the application, or the application may be enabled to provide the same service through a non-3GPP access. In case the network entity, at S1, determines that no UPPPC is setup at the entity, all incoming paging messages are allowed to be transmitted to the UE as is indicated at step S5 as case 3.

FIG. 10 illustrates embodiments for the transfer of a UPPPC request or the transfer of a UPPPC update request and the related procedures for a certain connection, like the first connection SIM_A of a multi-sim UE as illustrated in FIG. 4 and FIG. 5. Naturally, the subsequently described embodiments equally apply for a single-sim UE. In FIG. 9, details related to the existing connection in FIG. 4 and FIG. 5, namely to the second connection SIM_B are not shown. Further, FIG. 10 illustrates the procedures in connection with a 5CG, however, the inventive approach is equally applicable to networks implemented in a different way, for example for an EPC for which the AMF is to be replaced with the MME and the SMF is to be replaced with the S-GW (serving gateway). In FIG. 10, the first network NTW_A of FIG. 4 and FIG. 5 includes the base station, gNB_A, the AMF_A and the SMF_A of which the AMF_A and the SMF_A are part of the core network, 5GC, while the gNB_A and the connection SIM_A are part of the radio access network, RAN.

FIG. 10(*a*) illustrates an embodiment of case 1 described above with reference to FIG. 9 in step S3. The first connection SIM_A of the multi-sim UE as it is for example illustrated in FIG. 4 and FIG. 5, transmits an RRC message piggybacked with the UPPPC request 410 to the gNB_A which forwards 412 the UPPPC to the 5GC, more specifically, to the AMF_A. The AMF_A adds the user preferred paging profile and the user preferred paging profile conditions to the UE context as indicated at 414. Once the AMF_A accepted the UPPPC request and added the information to the UE context, the AMF_A, at 416, sends a UPPPC accept message to the gNB_A, and the gNB_A forwards the UPPPC accept message at 418 to the SIM_A connection of the UE, for example using the above described RRC message piggybacked with the UPPPC accept information in the DL-DCCH. As mentioned above, in accordance with other embodiments, the signaling at 416 and 418, in case the AMF_A does not accept the request, indicates a rejection or non-acknowledgement of the UPPPC request to the SIM_A via the gNB_A which, optionally, may include the cause for the rejection. In accordance with yet other embodiments, the procedural steps 416 and 418 may be omitted in case the AMF_A does not accept the UPPPC request so that the UE, not receiving the acknowledgment or accept message within a predefined time period recognizes that the user preferred paging profile has not been added or is not used by the core network.

Once the system is setup in the above described way, at a later time the SMF_A may issue a paging request 420. The AMF_A determines that the paging request satisfies the UPPPC as is indicated at 422. Responsive to determining that the paging request satisfies the UPPPC, the AMF_A, at 424 informs the SMF_A accordingly, for example by sending a message indicating that the paging request is accepted. Further, the AMF_A sends the paging information to the gNB_A at 426 which, in turn, sends the paging message to the first connection SIM_A as indicated at 428. The gNB_A, responsive to the paging information received from the AMF_A at 426 creates the paging message that is forwarded to the SIM_A.

FIG. 10(*b*) illustrates an embodiment of case 2 described above with reference to FIG. 9 at step S4. Those procedural steps for setting up the UPPPC at the AMF_A already described with reference to FIG. 10(*a*) are also illustrated but not described again. In FIG. 10(*b*), once the system is setup as described above with reference to FIG. 10(*a*), the SMF_A issues a paging request at 420 that is evaluated at the AMF_A on the basis of the received profile/profile conditions and it is determined at 430 that the paging request does not satisfy the UPPPC. The SMF_A is informed accordingly at 432. More specifically, the AMF_A transmits for the paging request a non-acknowledgement and, optionally, a cause for the non-acknowledgement. As may be seen from a comparison of FIG. 10(*a*) and FIG. 10(*b*), no signaling from the AMF_A towards the RAN with regard to the paging request 420 occurs, i.e., the incoming paging message is prevented from being transmitted to the UE.

FIG. 10(*c*) illustrates the procedure for case 3 described above with reference to FIG. 9 at step S5. In a similar way as in FIG. 10(*a*) and in FIG. 10(*b*) the UE transmits via the gNB_A, the UPPPC request to the AMF_A as illustrated at 410 and at 412. However, in the embodiment depicted in FIG. 10(*c*), the AMF_A decides that this request is not allowed and the user preferred paging profiles/conditions are not added to the UE context as indicated at 434. In accordance with the depicted embodiment, the UE is informed accordingly, and the AMF_A sends at 436 the UPPPC reject message to the gNB_A which, in turn, transmits the UPPPC reject and, optionally, a cause for the reject, to the UE or the first connection SIM_A of the UE as is indicated at 438 using one of the above described RRC messages piggybacked with the respective message from the gNB. In accordance with other embodiments, as mentioned above, when not adding the profile/condition to the UE context, as indicated at 434, no message may be sent to the UE which, responsive to a certain time period within which no acknowledgement for the request has been received, is aware that the request has not been accepted and the profile/condition is not added to the context. In such a situation, when the SMF_A issues a paging request at 420, the AMF_A performs no check, as is indicated at 440 and acknowledges the paging request to the SMF_A as indicated at 424. The paging information 426 is forwarded to the gNB_A which creates and forwards the paging message 428 to the UE. Thus, without the preferred paging profile/condition added to the UE context all incoming paging requests or paging messages are finally transmitted to the UE.

FIG. 10(*d*) illustrates an embodiment for updating a profile including the receipt of a NAS acceptance. In FIG. 10(*d*), the connection SIM_A of the UE transmits a UPPPC update request, for example piggybacked on an RRC message in a way as described above, as is indicated at 442. The gNB_A forwards the received update request at 444 to the AMF_A which allows the update and updates the UE context accordingly, as is indicated at 446. Responsive to updating the context, the AMF_A sends a UPPPC accept message 448 to the gNB_A which piggybacks this accept message with an RRC message in a way as described above for transmitting it at 450 to the UE using NAS signaling.

FIG. 10(*e*) illustrates an embodiment of a UPPPC update with a NAS rejection. In a similar way as in FIG. 10(*d*) the UE requests at 442 and 444 an update, however, the AMF_A rejects the update and the UE context is not updated, as is indicated at 452. Responsive to not updating the UE context, the AMF_A sends a UPPPC reject message 454 to the gNB_A which, in turn, piggybacks this message onto an RRC message and sends it to the UE at 456 using NAS signaling. In accordance with other embodiments, the signaling at 454 and 456 may be omitted so that the UE not receiving an acknowledgement within a predefined time period after the update request recognizes that the update has not been accepted and that the system continues to operate on the basis of the existing non-updated profile.

In accordance with embodiments, the UE may signal together with the UPPPC message described above with reference to FIG. 10 also a requested user profile. There may be no direct reply message from the network in the sense of accepting or rejecting the profile, however, a different signaling path from the network to the UE may inform the UE about the currently active UPPPC profile. For example, the AMF may reply to a request with the UPPPC profile which is currently active, which may be the requested profile or a different profile. In accordance with other embodiments, the network may reply to the request which means that the current or default profile remains active. In addition, the UE may also provide changes to an active UPPPC profile by a delta signaling within the discretion of the network in a way as shown in FIG. 10(*d*) and FIG. 10(*e*).

In accordance with yet further embodiments of the present invention, a so-called activity window may be employed. For example, whenever a UE initiates a communication, for example when a single UE switches to the RRC_CONNECTED state, or when a certain connection in a multi-sim UE switches to the RRC_CONNECTED state, or in case a paging message is forwarded, in accordance with the requested conditions, to the UE and is received by the UE, the network may assume that the UE or a certain connection of the multi-sim UE now activated, is active for a certain time period. During this time period, also referred to as the activity window, the profile stored at the AMF, for example, may not be applied to allow some or all operation requests to pass to the UE. The activity window may be configured by the network or may be preconfigured. Once the activity window is closed or has expired, the network may apply a current UPPPC profile again.

Thus, in accordance with the embodiments described above, by employing the UPPPC, the service interruption time in a multi-sim UE may be reduced when one of the connections is in the RRC_CONNECTED state with the corresponding network, and in case the UE needs to monitor the paging occasion of one or more other connections. However, embodiments of the present invention are equally applicable to the case when all connections or sim cards are in the RRC_IDLE or RRC_INACTIVE state. Likewise, the inventive approach is equally applicable for single-sim devices as described above. For example, when considering a situation in which a single-sim device, or also a multi-sim device, is low on power and needs to conserve battery, a UPPPC may be indicated to the network to allow only operation requests, like paging messages, to be transmitted to the UE which are deemed needed for the UE or to only allow emergency or important operation requests, like emergency messages or the like, to reach the UE.

Figure 11:
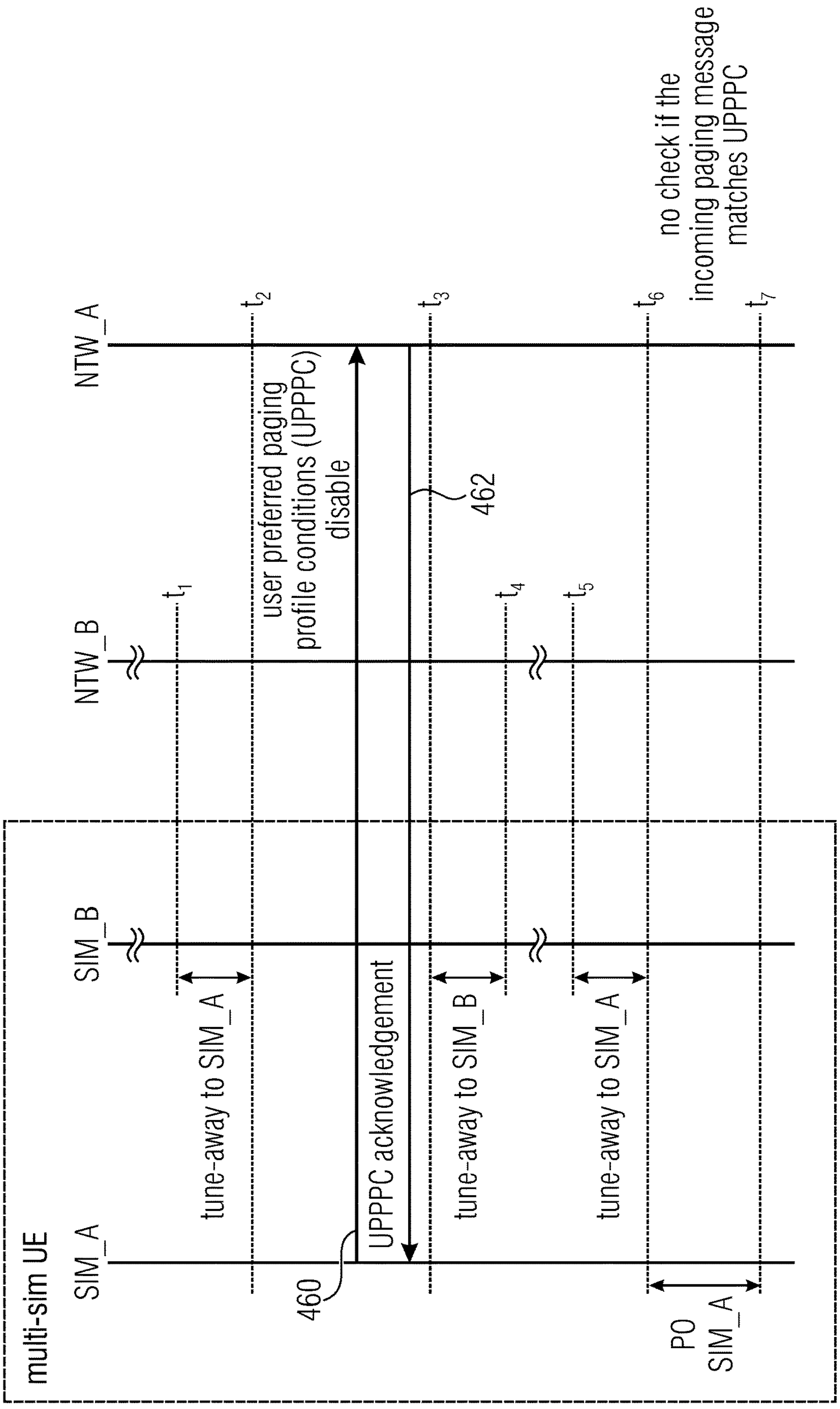
FIG. 11 illustrates an embodiment allowing a UE to disable the inventive functionality.

In accordance with yet further embodiments of the present invention, the UE may disable the inventive functionality, when needed, and the network procedure may fall back to case 3 as described above with reference to FIG. 9 at step S5. FIG. 11 illustrates an embodiment allowing a UE to disable the inventive functionality. FIG. 11 is similar to FIG. 4, and the multi-sim UE, during the time period between t2 and t3 during which the multi-sim UE is tuned-away from the second connection SIM_B, transmits, for example via a NAS signaling, a disable message to the first network NTW_A, like a user preferred paging profile conditions disable message 460. The network NTW_A, optionally, may send a corresponding acknowledgement 462 to the SIM_A. As a consequence of the disable request at 460, during the next paging occasion PO SIM_A between times t6 and t7, the network NTW_A no longer checks if an incoming paging message is to be transmitted to the UE or not, rather, any incoming message is forwarded to the UE as in case 3 described above with reference to FIG. 9 at step S5.

In accordance with embodiments, the above described single- or multi-sim device also include devices including one or more transceiver chains allowing to simultaneously receive and transmit on one or more connections to the one or more wireless communication systems, also referred to as full duplex transceivers.

General

Embodiments of the present invention have been described in detail above, and the respective embodiments and aspects may be implemented individually or two or more of the embodiments or aspects may be implemented in combination.

With regard to the above-described embodiments of the various aspects of the present invention, it is noted that they have been described in an environment in which a communication is between a transmitter, like a gNB or a UE, and a receiver, like a UE and a gNB. However, the invention is not limited to such a communication, rather, the above-described principles may equally be applied for a device-to-device communication, like a D2D, V2V, V2X communication. In such scenarios, the communication is over a sidelink between the respective devices. The transmitter is a first UE and the receiver is a second UE communicating using the sidelink resources.

In accordance with embodiments, the wireless communication system may include a terrestrial network, or a non-terrestrial network, or networks or segments of networks using as a receiver an airborne vehicle or a spaceborne vehicle, or a combination thereof.

In accordance with embodiments, a receiver may comprise one or more of a mobile or stationary terminal, an IoT device, a ground-based vehicle, an aerial vehicle, a drone, a building, or any other item or device provided with network connectivity enabling the item/device to communicate using the wireless communication system, like a sensor or actuator. In accordance with embodiments, a transmitter may comprise one or more of a macro cell base station, or a small cell base station, or a spaceborne vehicle, like a satellite or a space, or an airborne vehicle, like a unmanned aircraft system (UAS), e.g., a tethered UAS, a lighter than air UAS (LTA), a heavier than air UAS (HTA) and a high altitude UAS platforms (HAPs), or any transmission/reception point (TRP) enabling an item or a device provided with network connectivity to communicate using the wireless communication system.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Figure 12:
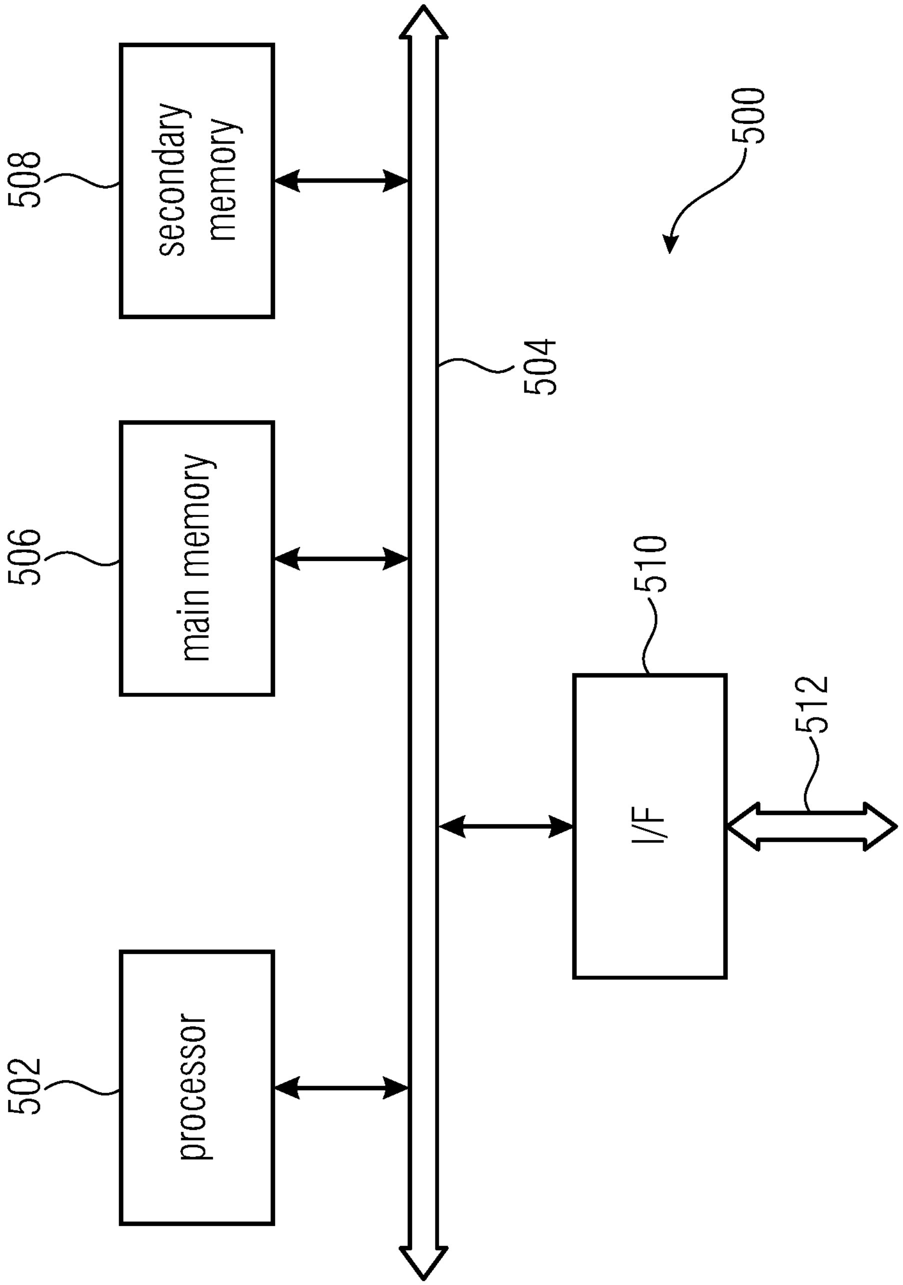
FIG. 12 illustrates an example of a computer system on which units or modules as well as the steps of the methods described in accordance with the inventive approach may execute.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 12 illustrates an example of a computer system 500. The units or modules as well as the steps of the methods performed by these units may execute on one or more computer systems 500. The computer system 500 includes one or more processors 502, like a special purpose or a general-purpose digital signal processor. The processor 502 is connected to a communication infrastructure 504, like a bus or a network. The computer system 500 includes a main memory 506, e.g., a random-access memory (RAM), and a secondary memory 508, e.g., a hard disk drive and/or a removable storage drive. The secondary memory 508 may allow computer programs or other instructions to be loaded into the computer system 500. The computer system 500 may further include a communications interface 510 to allow software and data to be transferred between computer system 500 and external devices. The communication may be in the from electronic, electromagnetic, optical, or other signals capable of being handled by a communications interface. The communication may use a wire or a cable, fiber optics, a phone line, a cellular phone link, an RF link and other communications channels 512.

The terms "computer program medium" and "computer readable medium" are used to generally refer to tangible storage media such as removable storage units or a hard disk installed in a hard disk drive. These computer program products are means for providing software to the computer system 500. The computer programs, also referred to as computer control logic, are stored in main memory 506 and/or secondary memory 508. Computer programs may also be received via the communications interface 510. The computer program, when executed, enables the computer system 500 to implement the present invention. In particular, the computer program, when executed, enables processor 502 to implement the processes of the present invention, such as any of the methods described herein. Accordingly, such a computer program may represent a controller of the computer system 500. Where the disclosure is implemented using software, the software may be stored in a computer program product and loaded into computer system 500 using a removable storage drive, an interface, like communications interface 510.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LIST OF ACRONYMS AND SYMBOLS

BS Base Station
CBR Channel Busy Ratio
D2D Device-to-Device
EN Emergency Notification
eNB Evolved Node B (base station)
FDM Frequency Division Multiplexing
LTE Long-Term Evolution
PC5 Interface using the Sidelink Channel for D2D communication
PPPP ProSe per packet priority
PRB Physical Resource Block
ProSe Proximity Services
RA Resource Allocation
SCI Sidelink Control Information
SL sidelink
sTTI Short Transmission Time Interval
TDM Time Division Multiplexing
TDMA Time Division Multiple Access
TPC Transmit power control/transmit power command
UE User Entity (User Terminal)
URLLC Ultra-Reliable Low-Latency Communication
V2V Vehicle-to-vehicle
V2I Vehicle-to-infrastructure
V2P Vehicle-to-pedestrian
V2N Vehicle-to-network
V2X Vehicle-to-everything, i.e., V2V, V2I, V2P, V2N

The invention claimed is:

1. A device comprising:

a processor circuit and a memory circuit, wherein the memory is arranged to store instructions for the processor circuit, wherein the processor circuit is arranged to signal information to a wireless communication system, wherein the processor circuit is arranged to process communications received over each connection of a plurality of communication connections, wherein the information enables a network entity of the wireless communication system to decide how to handle at least one incoming operation request intended for the device, wherein the processor circuit is arranged to signal the information for one, some, or all of the connections being in the RRC CONNECTED state.

2. The device of claim 1, wherein the information indicates at least one condition, wherein the network entity handles at least one incoming operation request based on the at least one condition.

3. The device of claim 2, wherein the at least one condition indicates that only a first operation request is forwarded to the UE.

4. The device of claim 2, wherein the at least one condition comprises:

a quality of service, QoS, of an application;

a priority of an application;

a traffic type, like data, call, SMS, emergency; and a traffic direction.

5. The device of claim 1, wherein the information comprises at least one user profile.

6. The device of claim 1, wherein the information is stored in the wireless communication system as a user device specific information.

7. The device of claim 1, wherein the processor circuit is arranged to send the information via Non-Access Stratum signaling, or via Access Stratum signaling to the network entity.

8. The device of claim 1, wherein the network entity comprises the Access and Mobility Function or the Mobility Management Entity of the core network of the wireless communication system.

9. A device comprising:

at least one transceiver chain, a processor circuit and a memory circuit, wherein the memory is arranged to store instructions for the processor circuit, wherein the processor circuit is arranged to share at least one transceiver chain with at least two connections to at least one wireless communication system, wherein the processor circuit is arranged to signal information to the wireless communication system, wherein the information enables a network entity of the wireless communication system to decide how to handle at least one incoming operation request for the device, wherein the processor circuit is arranged to signal the information for one, some, or all of the connections being in the RRC CONNECTED state.

10. A network entity comprising:

a processor circuit and a memory circuit, wherein the memory is arranged to store instructions for the processor circuit, wherein the processor circuit is arranged to decide how to handle at least one incoming operation request for at least one user device, wherein the at least one incoming operation request comprises a request for the network entity to communicate with the at least one user device, wherein the processor circuit is arranged to forward the at least one incoming operation request if the at least one incoming operation request satisfies a condition, wherein the processor circuit is arranged to not forward the at least one incoming operation request if the at least one incoming operation request does not satisfy the condition, wherein the processor circuit is arranged to send a response to a source of the at least one incoming operation request, wherein the response indicates whether the at least one incoming operation request is forwarded to the UE or not.

11. The network entity of claim 10, wherein the processor circuit is arranged to receive information, wherein the information enables the network entity to decide how to handle the at least one incoming operation request from at least one of the following:

the at least one user device;

a network entity of a second wireless communication system; and a storage circuit.

12. The network entity of claim 10, wherein the processor circuit is arranged to forward the at least one incoming operation request if the at least one incoming operation request satisfies a condition, wherein the processor circuit is arranged to not forward the at least one incoming operation request if the at least one incoming operation request does not satisfy the condition.

13. The network entity of claim 12, wherein the processor circuit is arranged to send to the source of the at least one incoming operation request when forwarding does not take place, at least one of: no acknowledgement message; a non-acknowledgement message; and a non-acknowledgement message and a cause of not forwarding the operation request.

14. The network entity of claim 10, wherein the network entity comprises a base station.

15. A method for operating a user device comprising:

signaling information to a wireless communication system, wherein the information enables a network entity of the wireless communication system to decide how to handle at least one incoming operation request intended for the user device, wherein the user device is a multi-connection user device, wherein the multi-connection user device comprises at least one transceiver chain, wherein at least one transceiver chain is shared by at least two connections to at least one wireless communication system, wherein the information comprises one, some, or all of the connections being in the RRC CONNECTED state.

16. The method of claim 15, further comprising deciding how to handle the at least one incoming operation request for the user device.

* * * * *